United States Patent
Gopal

(10) Patent No.: US 10,270,598 B2
(45) Date of Patent: Apr. 23, 2019

(54) SECURE ELLIPTIC CURVE CRYPTOGRAPHY INSTRUCTIONS

(71) Applicant: Intel Corporation, Santa Clara, CA (US)

(72) Inventor: Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 15/248,643

(22) Filed: Aug. 26, 2016

(65) Prior Publication Data

US 2018/0062843 A1    Mar. 1, 2018

(51) Int. Cl.
*H04L 9/30* (2006.01)
*G06F 7/72* (2006.01)
*G06F 21/72* (2013.01)

(52) U.S. Cl.
CPC ............ *H04L 9/3066* (2013.01); *G06F 7/725* (2013.01); *G06F 21/72* (2013.01); *H04L 2209/12* (2013.01); *H04L 2209/16* (2013.01)

(58) Field of Classification Search
CPC ....... H04L 9/3066; G06F 7/725; G06F 7/728; G06F 7/729
See application file for complete search history.

(56) References Cited

U.S. PATENT DOCUMENTS

| | | | |
|---|---|---|---|
| 7,739,521 B2 | 6/2010 | Brickell | |
| 7,925,011 B2 | 4/2011 | Gopal et al. | |
| 7,961,877 B2 | 6/2011 | Gopal et al. | |
| 8,112,066 B2 | 2/2012 | Ben Ayed | |
| 8,290,149 B2 | 10/2012 | Brickell | |
| 8,799,343 B2 | 8/2014 | Gueron et al. | |
| 9,014,368 B2 | 4/2015 | Teglia | |
| 9,092,645 B2 | 7/2015 | Ozturk et al. | |
| 2005/0002532 A1 | 1/2005 | Zhou et al. | |
| 2005/0084098 A1 | 4/2005 | Brickell | |

(Continued)

FOREIGN PATENT DOCUMENTS

WO    2017/052811 A    3/2017

OTHER PUBLICATIONS

International Search Report and Written Opinion dated Nov. 2, 2017, on application No. PCT/US2017/043161.

(Continued)

*Primary Examiner* — Ellen Tran
(74) *Attorney, Agent, or Firm* — Lowenstein Sandler LLP

(57) ABSTRACT

A processor of an aspect includes a decode unit to decode an elliptic curve cryptography (ECC) point-multiplication with obfuscated input information instruction. The ECC point-multiplication with obfuscated input information instruction is to indicate a plurality of source operands that are to store input information for an ECC point-multiplication operation. At least some of the input information that is to be stored in the plurality of source operands is to be obfuscated. An execution unit is coupled with the decode unit. The execution unit, in response to the ECC point-multiplication with obfuscated input information instruction, is to store an ECC point-multiplication result in a destination storage location that is to be indicated by the ECC point-multiplication with obfuscated input information instruction. Other processors, methods, systems, and instructions are disclosed.

24 Claims, 15 Drawing Sheets

(56) References Cited

U.S. PATENT DOCUMENTS

| | | |
|---|---|---|
| 2006/0212506 A1 | 9/2006 | Vasyltsov |
| 2008/0019509 A1 | 1/2008 | Al-Gahtani et al. |
| 2008/0019512 A1 | 1/2008 | Gueron et al. |
| 2008/0025498 A1* | 1/2008 | Vasyltsov ............... G06F 7/725 380/28 |
| 2008/0147768 A1 | 6/2008 | Gopal et al. |
| 2008/0219437 A1* | 9/2008 | Ebeid ..................... G06F 7/725 380/30 |
| 2009/0136025 A1 | 5/2009 | Kargl et al. |
| 2009/0193250 A1 | 7/2009 | Yokota et al. |
| 2011/0064215 A1 | 3/2011 | Michiels et al. |
| 2012/0102307 A1 | 4/2012 | Wong |
| 2013/0279692 A1 | 10/2013 | Bevan |
| 2013/0346461 A1 | 12/2013 | Fischer |
| 2014/0157002 A1 | 6/2014 | Grobman et al. |
| 2015/0006968 A1 | 1/2015 | ShanBhogue et al. |
| 2015/0161408 A1 | 6/2015 | Shanbhogue et al. |
| 2016/0043853 A1 | 2/2016 | Lin |
| 2016/0328543 A1* | 11/2016 | Hoogerbrugge ........ G06F 21/14 |
| 2016/0380772 A1 | 12/2016 | Gopal et al. |
| 2017/0091488 A1 | 3/2017 | Gopal et al. |
| 2017/0093567 A1 | 3/2017 | Gopal et al. |

OTHER PUBLICATIONS

International Search Report and Written Opinion dated Mar. 24, 2017 on application No. PCT/US2016/045980.

* cited by examiner

Method in processor of performing ECC point-multiplication with
obfuscated input information instruction
230

Receive an ECC point-multiplication with obfuscated input information
instruction indicating source operand(s) storing input information for an ECC
point-multiplication operation, where at least a first portion of the input
information is obfuscated ⟿ 231

Store an ECC point-multiplication result, in a destination storage location
indicated by the ECC point-multiplication with obfuscated input information
instruction, in response to receiving the ECC point-multiplication with
obfuscated input information instruction ⟿ 232

FIG. 2

Method in processor of performing ECC point-multiplication with
obfuscated input information instruction with Montgomery reduction
335

| Receive ECC point-multiplication with obfuscated input information instruction indicating source operand(s) storing optionally obfuscated scalar multiplier (k), optionally obfuscated modulus (p), and optionally one or more optionally obfuscated reduction constants used in Montgomery reduction | ⟿ 336 |

Deobfuscate any optionally obfuscated input information ⟿ 337

Calculate reduction constants R2 and μ of Montgomery reduction based on modulus (p) if not provided in source operand(s) ⟿ 338

Perform ECC point-multiplication calculations with Montgomery reduction utilizing reduction constants ⟿ 339

Store ECC point-multiplication result in destination storage location ⟿ 340

FIG. 3

ECC POINT-
MULTIPLICATION WITH
OBFUSCATED INPUT
INFORMATION
INSTRUCTION
402

| OPCODE 442 | FIRST SOURCE OPERAND INDICATION FIELD 444 | SECOND SOURCE OPERAND INDICATION FIELD 446 | THIRD SOURCE/DEST OPERAND INDICATION FIELD 448 | OPERAND SIZE INDICATION FIELD 450 | ONE OR MORE OPERAND OBFUSCATION INDICATION FIELDS 452 |

SECURE ELLIPTIC CURVE CRYPTOGRAPHY INSTRUCTIONS

BACKGROUND

Cryptography may be used to perform key exchanges to help protect the confidentiality and integrity of data and/or communications. Two types of cryptography are symmetric key cryptography and asymmetric or public-key cryptography. Symmetric key cryptography uses a single type of key. The same key is used both to encrypt data and to decrypt data. Also, the same key is used both to generate a digital signature and to verify the digital signature. In contrast, public-key cryptography uses two different types of keys. One of the keys is secret or private, whereas the other key is not secret but rather is publically available. The public and private keys are used for different complementary purposes. For example, the public key may be used to encrypt data, whereas the private key may be used to decrypt the encrypted data. As another example, the private key may be used to generate a digital signature, whereas the public key may be used to verify the digital signature.

Public-key cryptography is widely used. For example, public-key cryptography is widely used in various Internet standards or protocols, such as, for example, Secure Sockets Layer (SSL), Transport Layer Security (TLS), Internet Protocol Security (IPsec), Secure/Multipurpose Internet Mail Extensions (S/MIME), Pretty Good Privacy (PGP), and GNU Privacy Guard (GPG).

When such standards or protocols are employed over the Internet and/or other communication channels, an initial phase generally involves establishing the security of the channel, exchanging cryptographic keys, and verifying certificates. Various public key algorithms may be used. One public key algorithm is the Diffie-Hellman key exchange algorithm, which is sometimes referred to as Diffie-Hellman, or simply as D-H. The Diffie-Hellman algorithm is commonly used to securely exchange secret cryptographic keys over a public channel. Another public key algorithm is the Digital Signature Algorithm (DSA) algorithm. DSA is commonly used to provide digital signatures. Yet another public key algorithm is the RSA algorithm (named after its authors Rivest, Shamir, Adleman). RSA is commonly used to securely exchange secret cryptographic keys as well as to provide digital signatures. The secure communication channel can be setup using ECC operations (e.g., ECC point-multiplication instructions).

BRIEF DESCRIPTION OF THE DRAWINGS

FIG. 2 is a block flow diagram of a method of performing ECC point-multiplication with obfuscated input information instruction, according to one embodiment.

FIG. 3 is a block flow diagram of a detailed example of a method of performing ECC point-multiplication with obfuscated input information instruction with Montgomery reduction, according to one embodiment.

FIG. 4 is a block diagram of ECC point-multiplication with obfuscated input information instruction, according to one embodiment.

DETAILED DESCRIPTION OF EMBODIMENTS

Figure 1:
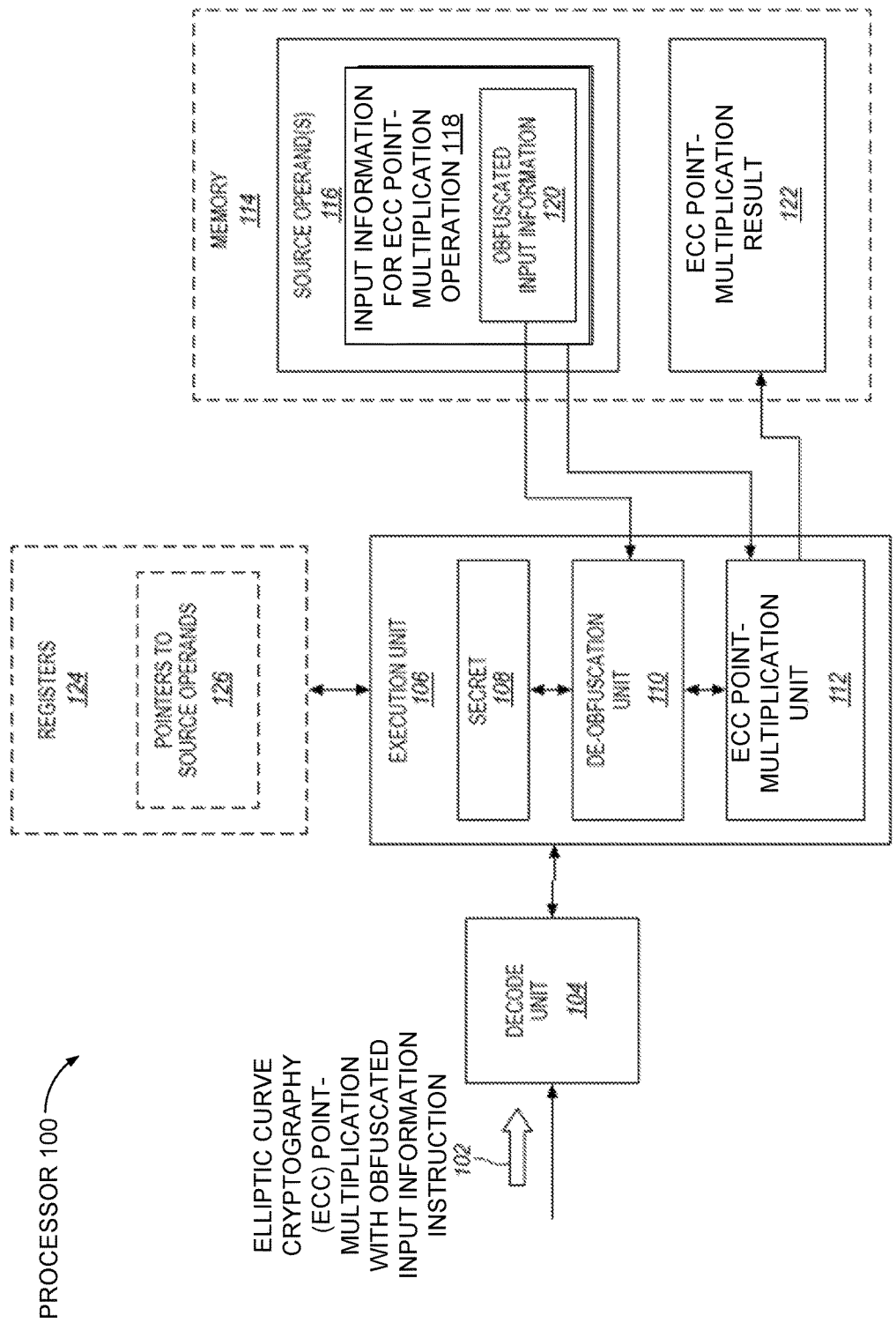
FIG. 1 is a block diagram of a processor that is operative to perform elliptic curve cryptography (ECC) point-multiplication with obfuscated input information instruction, according to one embodiment.

Disclosed herein are ECC point-multiplication instructions, processors to execute the instructions, methods performed by the processors when processing or executing the instructions, and systems incorporating one or more processors to process or execute the instructions. In some embodiments, the ECC point-multiplication instructions may be used to perform ECC point-multiplication in conjunction with various different public-key cryptography algorithms, such as, for example, RSA, DSA, and Diffie-Hellman algorithms. In such public-key cryptography algorithms, ECC point-multiplication tends to be used heavily when establishing secure sessions over the Internet and/or other communication links (e.g., in conjunction with secure session setup, certificate signing, certificate verification, and the like). In other embodiments, the ECC point-multiplication instructions disclosed herein may be used to perform ECC point-multiplication in conjunction with various other computer implemented algorithms and/or communication related algorithms and/or data processing algorithms. The scope of the disclosure is not limited to any known use of these ECC point-multiplication instructions, but rather they are general-purpose instructions that may be used for various different purposes by those skilled in the arts.

In the following description, numerous specific details are set forth (e.g., specific instruction operations, specific algorithms for implementing ECC point-multiplication, specific data formats, specific processor configurations, specific microarchitectural details, specific sequences of operations, etc.). However, embodiments may be practiced without these specific details. In other instances, well-known circuits, structures and techniques have not been shown in detail to avoid obscuring the understanding of the description.

Secure communications by processor cores in a trusted-computing environment may use a cipher to encrypt transferred data and a keyed message-authentication code. For example, the processor can setup a secure communication session by establishing a secure channel and performing key exchanges with certificate verification. As described above, RSA is commonly used to securely exchange secret cryptographic keys as well as to provide digital signatures.

However, conventional software implementations of ECC point-multiplication may not sufficiently protect such secret or private information. For example, such secret or private information is generally readable or otherwise accessible to at least some software. However, all software, including even the most highly privileged system-level software (e.g., a virtual machine monitor (VMM), operating system (OS), basic input/output system (BIOS), or the like), may potentially be corrupted (e.g., in the case of privileged malware) and therefore may not be fully trustworthy, thereby impeding ultra-secure computations on processor cores. If the software is corrupted and is able to read the secret or private information, then the intended security associated with the public-key cryptographic algorithms may be at least partially compromised. In some cases, this can be a tremendous problem. As one example, in some cases the secret key may be extremely valuable (e.g., more valuable than the data being protected in a single session). As another example, in the OpenSSL Heartbleed vulnerability, due to a bug in OpenSSL, any private key of a supposedly trusted web-server could have potentially been stolen due to a memory buffer overflow. This could allow the web server to be sufficiently impersonated so that clients may not know whether or not they are communicating with the real web-server or an imposter web server.

The ECC operation can be performed at high performance on central processing unit (CPU) cores, especially if there are special instructions to accelerate processing of the mathematical computations (e.g., mulx, adcx, adox, etc.). However, in usages where a secret key is extremely valuable (e.g., more valuable than the data being protected in a single session), there is a need for a mechanism to perform the usage is an ultra-secure way.

Embodiments described herein use obfuscated information in the ECC point-multiplication to enhance the protection of secret or confidential information (e.g., the information input to the ECC point-multiplication calculations). Also disclosed herein are instructions to perform a "key-locked" ECC operation (e.g., the original secret key is never visible to the software). The ECC point-multiplication instructions may use prime fields, binary fields, and so forth. In some embodiments, the obfuscated information may not be accessible, or at least not readable, by even the most highly privileged system-level software (e.g., a VMM, an OS, a BIOS, etc.). Various different suitable ways of obfuscating the information will be discussed further below. This may be used to help increase the security of various public-key cryptography algorithms, as well as various other uses.

The level of security that can be achieved for servers running standard software applications such as OpenSSL is extremely valuable and can be achieved with high performance and easy software enabling (e.g., no OSV enabling dependencies). The ECC point-multiplication instruction can run in all privilege levels as opposed to specific security technologies that can run only in select levels. The instructions enable ultra-secure operations on processors using special ISA and these types of key-locked ISA can provide highly secured and trusted platforms.

FIG. 1 is a block diagram of an embodiment of a processor 100 that is operative to perform an embodiment of an ECC point-multiplication with obfuscated input information instruction 102. In some embodiments, the processor 100 may be a general-purpose processor (e.g., a general-purpose microprocessor or central processing unit (CPU) of the type used in desktop, laptop, or other computers). Alternatively, the processor 100 may be a special-purpose processor. Examples of suitable special-purpose processors include, but are not limited to, cryptographic processors, communications processors, network processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 100 may receive a first instruction. The first instruction may include the ECC point-multiplication with obfuscated input information instruction 102. For example, the instruction 102 may be pre-fetched, fetched, or otherwise received from memory over a bus or other interconnect. The instruction 102 may represent a macroinstruction, assembly language instruction, machine code instruction, or other instruction or control signal of an instruction set of the processor.

The processor 100 includes a decode unit 104 (e.g., decoder). The decode unit 104 may receive and decode the first instruction. The first instruction may include the ECC point-multiplication with obfuscated input information instruction 102. The decode unit 104 may output relatively lower-level instructions or control signals (e.g., microinstructions, microoperations, micro-code entry points, decoded instructions or control signals, etc.), which reflect, represent, and/or are derived from the relatively higher-level ECC point-multiplication with obfuscated input information instruction 102. In some embodiments, the decode unit 104 may include one or more input structures (e.g., port(s), interconnect(s), an interface) to receive the instruction, an instruction recognition and decode logic coupled therewith to recognize and decode the instruction 102, and one or more output structures (e.g., port(s), interconnect(s), an interface) coupled therewith to output the lower-level instructions or control signals. The decode unit 104 may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the ECC point-multiplication with obfuscated input information instruction 102 being provided directly to the decode unit 104, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor 100, such as, for example, on a separate die and/or in a memory (e.g., as a static, dynamic, or runtime emulation module). By way of example, the instruction conversion module may receive the ECC point-multiplication with obfuscated input information instruction 102, which may be of a first instruction set, and may emulate, translate, morph, interpret, or otherwise convert the ECC point-multiplication with obfuscated input information instruction 102 into one or more corresponding intermediate instructions or control signals, which may be of a second different instruction set. The one or more intermediate instructions or control signals of the second instruction set may be provided to a decode unit (e.g., decode unit 104), which may decode them into one or more lower-level instructions or control signals executable by native hardware of the processor 100 (e.g., one or more execution units).

In some embodiments, the ECC point-multiplication with obfuscated input information instruction 102 may explicitly specify (e.g., through one or more fields or a set of bits), or otherwise indicate (e.g., implicitly indicate), storage locations for a plurality of source operands 116. The source operands 116 may be used to store input information 118 for an ECC point-multiplication operation or calculation associated with the instruction 102. In some embodiments, the instruction 102 may also explicitly specify or otherwise indicate a destination storage location where an ECC point-multiplication result 122 is to be stored responsive to and/or as a result of the instruction 102. As one example, the instruction 102 may have source and/or destination operand fields to specify or otherwise indicate storage locations for these operands. Alternatively, the storage locations for one or more of these operands may optionally be implicit to the instruction 102 (e.g., implicit to an opcode of the instruction), rather than being explicitly specified.

As shown, the processor 100 during deployment and/or use may be operative to be coupled with, or otherwise in communication with, a memory 114. It is to be noted that embodiments of the disclosure pertain to a processor alone, which is capable or operative to be coupled with and to interact with the memory, but is not yet coupled with the memory. As shown, in some embodiments, the source operands 116, and the destination storage location where the ECC point-multiplication result 122 is to be stored, may optionally be locations in the memory 114. By way of example, in some embodiments, the instruction 102 may optionally specify or otherwise indicate registers, in a set of registers 124 of the processor 100, which may store addresses or other pointers to the locations in the memory 114 for these operands. Alternatively, one or more packed data registers, locations in a dedicated stream buffer of the processor, or other storage locations may optionally be used for one or more of these source and/or destination operands. Moreover, although shown as being separate in the illustration for ease of illustration, in some embodiments, the same storage location used for a source operand (e.g., for a base) may optionally be reused as the destination storage location to store the ECC point-multiplication result. For example, the instruction 102 may explicitly specify an address to indicate a location in memory 114 where a source operand is to be stored, and it may be implicit or inherent to the processor 100 (e.g., based on an opcode of the instruction 102) that the same location in memory 114 is to be used for the destination storage location.

The registers 124 may represent on-die storage locations that are operative to store data. In one aspect, the registers 124 may optionally be 32-bit or 64-bit general-purpose registers. The registers 124 may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers 124 may be implemented in different ways in different microarchitectures and are not limited to any particular type of design. Examples of suitable types of registers include, but are not limited to, dedicated physical registers, dynamically allocated physical registers using register renaming, and combinations thereof.

Referring again to FIG. 1, various different types of input information 118, including the obfuscated input information 120, are suitable for different embodiments. In some embodiments, the input information may include a base point, a scalar multiplier, a modulus, one or more parameters pre-calculated from the modulus (e.g., one or more reduction constants), or various combinations thereof. As will be discussed further below, various reduction algorithms for ECC point-multiplication (e.g., Mongomery reduction, Barrett reduction, etc.) define reduction constants, which are often derived from the modulus and/or potentially other input parameters, to help simplify the implementation of ECC point-multiplication. In general, any combination of input information sufficient to allow the ECC point-multiplication calculations to be performed may optionally be used in different embodiments.

In addition, any of such input information 118, including potentially none of it or potentially all of it or any intermediate level, may optionally be provided as the obfuscated input information 120 to help provide any additional amount of security desired for the particular implementation.

As one example, if a secret key to be derived based on the ECC point-multiplication calculations is intended to be used to protect information that is not considered sufficiently secret and/or deserving of the additional protections provided by the obfuscation (e.g., as determined for the particular implementation by the programmer), then none of the input information may optionally be obfuscated. Instead, potentially some enhanced performance may be achieved by omitting an operation to decrypt or otherwise de-obfuscated such obfuscated information. As another example, if a secret key to be derived based on the ECC point-multiplication calculations is intended to be used to protect information that is considered sufficiently secret and/or deserving of the additional protections provided by the obfuscation (e.g., as determined for the particular implementation by the programmer), then anywhere from at least some to all of the input information (e.g., an architecturally programmable or configurable portion) may optionally be obfuscated. For example, in one embodiment, the obfuscated input information may optionally include an obfuscated base point, an obfuscated scalar multiplier, and an obfuscated modulus, or any combination thereof.

In some embodiments, the instruction may flexibly specify or indicate whether or not one or more portions of the input information is obfuscated. For example, one programmable or configurable set of one or more bits of the instruction may indicate if the scalar multiplier is obfuscated, another programmable or configurable set of one or more bits of the instruction may indicate if the base point is obfuscated, and yet another programmable or configurable set of one or more bits of the instruction may indicate if the modulus is obfuscated. In other embodiments, the instruction may implicitly indicate (e.g., it may be fixed for an opcode) whether or not one or more portions of the input information is obfuscated. For example, it may be implicit to a first opcode of a first instruction that only a first portion (e.g., a scalar multiplier) is obfuscated, it may be implicit to a second different opcode of a second different instruction that only a second different portion (e.g., a modulus) is obfuscated, it may be implicit to a third different opcode of a third different instruction that only a third different portion (e.g., a base point) is obfuscated, and it may be implicit to a fourth still different opcode of a fourth still different instruction that multiple portions (e.g., all of the base point, scalar multiplier, and modulus) are obfuscated. Combinations of such approaches may also be used. For example, it may be implicit to an opcode that a first portion (e.g., a scalar multiplier) is obfuscated and a set of one or more bits of the instruction may indicate whether a second portion (e.g., a modulus) is obfuscated. Various different combinations of these approaches are contemplated.

A wide variety of different types of obfuscated input information 120 are suitable for different embodiments. The obfuscated input information is not the actual input information itself that is input into the ECC point-multiplication calculations. For example, an obfuscated scalar multiplier (k*) is not the actual scalar multiplier (k) that is input into the ECC point-multiplication calculations. Rather, the obfuscated scalar multiplier (k*) may represent an obfuscated value that may be de-obfuscated to determine the actual scalar multiplier (k) that is input into the ECC point-multiplication calculations. In various embodiments, the obfuscated input information may include any of a wide variety of different types of encrypted, convoluted, modified, or otherwise obfuscated input information from which the actual input information cannot be determined with except with one of difficulty, extreme difficulty, computational impracticality, or infeasibility, according to the particular level of enhanced security desired for the particular implementation, unless a secret (e.g., secret 108) is known. The secret (e.g., secret 108) may be known to the processor but not accessible or at least not readable by software (e.g., even the most highly privileged system-level software).

Referring again to FIG. 1, an execution unit 106 is coupled with the decode unit 104 and in some embodiments with the registers 124 (e.g., if the pointers to the source operands 126 are stored in the registers 124). When deployed in a system, in some embodiments, the execution unit 106 may be operative to be coupled with the memory 114 (e.g., to receive the source operands if they are stored therein). The execution unit 106 may receive the one or more decoded or otherwise converted instructions or control signals that represent and/or are derived from the ECC point-multiplication with obfuscated input information instruction 102. The execution unit 106 may also receive the input information 118 for the ECC point-multiplication operation, including any optional obfuscated input information 120. In some embodiments, there is optionally at least some obfuscated input information 120, although the scope of the disclosure is not so limited.

As shown, the execution unit 106 may include a secret 108, a de-obfuscation unit 110 coupled with the secret, and an ECC point-multiplication unit 112 coupled with the de-obfuscation unit 110. As previously described, the secret 108 may be available to the execution unit 106 and/or the processor 100, but not accessible to, or at least not readable by, software (e.g., even the most privileged-level system software). In some embodiments, the de-obfuscation unit 110 and/or the execution unit 106 and/or the processor 100 may be operative in response to and/or as a result of the ECC point-multiplication with obfuscated input information instruction 102 (e.g., in response to instructions or control signals decoded from the instruction) to use the secret 108 to de-obfuscate the obfuscated input information 120. The de-obfuscation and/or the generation of the actual input information may be performed entirely within the confines of the processor 100 such that the actual input information may never be readable by software. In some embodiments, the de-obfuscation unit 110 may optionally be operative, responsive to the instruction, to signal a fault if a de-obfuscation operation does not succeed. For example, in some embodiments, the obfuscated input information may include authentication or integrity check information that may be used to determine whether the de-obfuscation operation provides authenticatable input information and/or input information with integrity. In one aspect, such a failed de-obfuscation may cause a fault to be signaled and/or may cause further performance of the instruction to be stopped (e.g., prevent an ECC point-multiplication result from being generated and stored).

The secret 108 and the de-obfuscation are to be interpreted broadly herein as being based on any of a wide variety of different types of information, logic, or a combination of information and logic, from which the actual input information may be determined from the obfuscated input information, but without which the actual input information cannot except with at least difficult or extreme difficulty be determined from the obfuscated input information. In some embodiments, the obfuscated input information may represent encrypted input information and the secret may represent a secret cryptographic key that may be stored and/or generated on-die that may be used to decrypt the encrypted input information to determine the actual input information. In other embodiments, the secret may represent information that may be combined in a particular way (e.g., according to a cryptographic or mathematical algorithm) with the obfuscated input information to determine the actual input information.

In other embodiments, the secret 108 may represent information and/or logic that may be used to modify or transform the obfuscated input information in a particular way (e.g., according to a cryptographic, mathematical, or logical transformation) to determine the actual input information. In further embodiments, the secret may represent the actual input information itself stored as a secret on the processor, which may be selected and used if the obfuscated input information has a particular required value or passes a test or criteria. In still other embodiments, the secret may represent information and/or logic operative to modify the obfuscated input information in a secret way to determine the actual input information. In some embodiments, the secret may include information that earlier software stored into the processor by that later software is not able to read and/or logic that earlier software configured in the processor but that later software is not able to read or reconfigure, although the scope of the disclosure is not so limited. Alternatively, the secret may represent other types of secret on-die information and/or secret on-die logic that may be used to de-obfuscate the obfuscated input information. Various combinations of these approaches are also generally suitable. It is to be appreciated that these are just a few illustrative examples. Other approaches discussed elsewhere herein are also suitable. Moreover, still other approaches will be apparent to those skilled in the art and having the benefit of the present disclosure.

The ECC point-multiplication unit 112 may be operative to generate an ECC point-multiplication result 122 from the complete set of input information (e.g., including any de-obfuscated input information). In some embodiments, the ECC point-multiplication result may be generated within the execution unit and within the confines of the performance of the same single ECC point-multiplication with obfuscated input information instruction. One potential advantage is that this may help to avoid exposing cryptographically processed portions or intermediate results, which could potentially be analyzed to reveal the information that is supposed to be secret (e.g., any of the various types of obfuscated input information previously described). Rather, in some embodiments, all such intermediate results may be held within the ECC point-multiplication unit 112 and/or the execution unit 106 and/or the processor 100, instead of being stored in architecturally visible registers or memory locations. Once the ECC point-multiplication result 122 has been generated, the execution unit may be operative in response to and/or as a result of the instruction to store the ECC point-multiplication result 122 in the destination storage location (e.g., a location in memory 114) indicated by the instruction. Often, in the case of many public-key cryptography uses, the ECC point-multiplication result 122 may be stored in an unencrypted and non-obfuscated format, since it generally will be processed by regular software.

Advantageously, by providing obfuscated input information to the processor 100, instead of the actual input information, software (e.g., even privileged malware) may not be able to read the actual input information directly and may not with at least difficulty or in some embodiments extreme difficulty (e.g., according to the particular level of enhanced security desired for the particular implementation) be able to determine the actual input information. When used in conjunction with public-key cryptography, for example, this may help to protect secret or private information (e.g., private keys) and/or otherwise help to increase security.

The execution unit 106 and/or the processor 100 may include specific or particular logic (e.g., transistors, integrated circuitry, or other hardware potentially combined with firmware (e.g., instructions stored in non-volatile memory)) that is operative to perform the ECC point-multiplication with obfuscated input information instruction 102 and/or store the ECC point-multiplication result 122 in response to and/or as a result of the instruction (e.g., in response to instructions or control signals decoded therefrom). By way of example, the execution unit 106 may include a microcode engine, state machine, or the like, to perform the operations of the ECC point-multiplication. In some embodiments, the execution unit 106 may include one or more input structures (e.g., port(s), interconnect(s), an interface) to receive the input information and/or obfuscated input information, circuitry or logic coupled therewith to receive and process the received information and generate the ECC point-multiplication result 122, and one or more output structures (e.g., port(s), interconnect(s), an interface) coupled therewith to output the ECC point-multiplication result 122. To avoid obscuring the description, a relatively simple processor has been shown and described.

However, the processor 100 may optionally include other processor components. For example, various different embodiments may include various different combinations and configurations of the components shown and described for any of FIGS. 9-11. All of the components of the processor 100 may be coupled together to allow them to operate as intended.

FIG. 2 is a block flow diagram of an embodiment of a method 230 of performing an embodiment of an ECC point-multiplication with obfuscated input information instruction 102. In various embodiments, the method may be performed by a processor, instruction processing apparatus, or other digital logic device. In some embodiments, the method 230 may be performed by and/or within the processor 100 of FIG. 1. The components, features, and specific optional details described herein for the processor 100, also optionally apply to the method 230. Alternatively, the method 230 may be performed by and/or within a different processor or apparatus. Moreover, the processor 100 may perform different methods than the method 230.

The method includes receiving the ECC point-multiplication with obfuscated input information instruction 102, at block 231. In various aspects, the instruction 102 may be received at a processor or a portion thereof (e.g., an instruction fetch unit, a decode unit, a bus interface unit, etc.). In various aspects, the instruction 102 may be received from an off-processor and/or off-die source (e.g., from memory, interconnect, etc.), or from an on-processor and/or on-die source (e.g., from an instruction cache, instruction queue, etc.).

The ECC point-multiplication with obfuscated input information instruction 102 may specify or otherwise indicate a plurality of source operands (e.g., at a plurality of locations in memory) that store input information for an ECC point-multiplication operation. In some embodiments, the input information may include a base point, a scalar multiplier, a modulus, one or more parameters pre-calculated from the modulus (e.g., one or more reduction constant), or various combinations thereof sufficient to provide all needed input for the given approach. In some embodiments, at least some of the input information (e.g., any of the aforementioned input information) may optionally be obfuscated, although this is not required. The obfuscated input information may be the same as or similar to that described elsewhere herein.

An ECC point-multiplication result 122 may be stored in response to and/or as a result of the ECC point-multiplication with obfuscated input information, at block 232. The ECC point-multiplication result 122 may be stored in a destination storage location that is specified or otherwise indicated by the ECC point-multiplication with obfuscated input information instruction 102.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include any of those shown and described for any of FIG. 3 or 6-8, including the variations mentioned therefor.

One example operation that may optionally be performed is to de-obfuscate the obfuscated input information. This may optionally include operations of any of the de-obfuscation approaches discussed elsewhere herein.

Commonly, completely performing the ECC point-multiplication may take a relatively large number of cycles (e.g., from thousands to tens of thousands or even more depending upon the operand sizes). Completely performing the ECC point-multiplication with obfuscated input information instruction may take even more cycles due to the computations needed to de-obfuscate the operands.

Due in part to the relatively large number of cycles, it is possible that at times the performance of the instruction may be interrupted prior to completion. In some embodiments, one of several possible precautions may optionally be taken to help to ensure that partial or intermediate state, which could potentially be analyzed to determine secret information, does not become readable by software.

In some embodiments, the execution unit 106, in response to an interruption while performing the instruction, may be operative to stop performing the ECC point-multiplication calculations and/or the instruction, encrypt a current intermediate state calculated at or around the time of the interruption, and store the encrypted intermediate state in a storage location (e.g., a location in memory 114). By way of example, the intermediate state may be encrypted with a secret key of the processor that is not readable by software. After the interruption has been resolved, the encrypted intermediate state may be retrieved, decrypted, and the algorithm may resume starting with the recovered intermediate state. In other embodiments, the execution unit, in response to an interruption while performing the instruction, may be operative to stop performing the ECC point-multiplication calculations and/or the instruction, and store a current intermediate state calculated at or around the time of the interruption in an on-die storage of the processor (e.g., a non-architecturally visible storage) that is not readable by software. In other embodiments, the execution unit, in response to an interruption while performing the instruction, may be operative to stop performing the ECC point-multiplication calculations and/or the instruction, and discard a current intermediate state calculated at or around the time of the interruption. Any of these approaches may optionally be used in the processor 100 of FIG. 1 and/or the method 230 of FIG. 2.

ECC point-multiplication involves an elliptic curve. An elliptic curve is a curve over a finite-field (e.g., modulo a prime p) including points that satisfy the equation $y^2=x^3+ax+b \pmod p$. The value for p may be a large prime number.

The elliptic curve has a special point called the point-at-infinity. The essential curve parameters are {a, b, p} along with a generator point and its order. For all the National Institute of Standards and Technology (NIST) Prime curves, parameter "a" has a special value of (p−3), and is illustrated using the special value for "a."

The group operations over the points of the curve are defined by: 1) "addition" of two points, or 2) "doubling" of a point.

Considering a first point P1 defined as (x1, y1) and a second point P2 defined as (x2, y2), where P1!=−P2, the following is defined as:

P3=(x3, y3)=P1+P2 ("adding" two points) as:
$x3=L^2-x1-x2 \pmod p$
$y3=L(x1-x3)-y1 \pmod p$
where $L=(y2-y1)/(x2-x1) \pmod p$
"Doubling" of a point P1 is defined as:
$x3=L^2-2x1 \pmod p$
$y3=L(x1-x3)-y1 \pmod p$
where $L=(3x1^2-3)/2y1 \pmod p$ Since the computations for L involve an inversion operation (equivalent of division) which is expensive, other coordinate representations can be used such as projective coordinates. Using Jacobian projective coordinates, the projective point (x, y, z) for z!=0, is mapped to the affine point $(x/z^2, y/z^3)$, and to the point-at infinity when z=0. Once the coordinates are transformed to projective, a series of point-adds or point-doubles can be done with no costly inversion operations. After the series of point adds/doubles, one has to convert back to affine which needs an inversion operation. However, that cost is amortized over a whole series of point adds/doubles. The essential operation in ECC is called scalar point multiplication, where a point is "multiplied" by a scalar.

To efficiently compute large integer modular arithmetic used inside the point-add/double, an efficient reduction algorithm is needed. Often times, ECC curves are defined with special primes (e.g., NIST p256) where reduction can be done fast without any division.

Though the loop shows a right-to-left method, a left-to-right method can be defined, combined with windowing techniques that group a set of bits, or non-adjacent-form (NAF) representations for increased performance.

The ECC point multiplication with obfuscated input information instruction 102 may be used for a secure elliptic curve point multiplication operation with arbitrary sized operands to convert known important public-key algorithms used in protocols such as SSL (Secure Socket Layer)/TLS (Transport Layer Security) and IPSec (Internet Protocol Security). ECC point-multiplication is used in TLS/SSL, National Security Suite-B algorithms, emerging standards such as Border Gateway Protocol (e.g., that need security have adopted ECC with P-256). IETF (Internet Engineering Task Force) is developing BGPSEC (Border Gateway Protocol Security) Standard and the performance efficiency of ECC is critical to meet strict internet routing table convergence requirements.

The instruction 102 can be defined with three arbitrary length operands corresponding to p, B, and k. A general range of sizes can be from 192-bit operands to 512-bit in multiples of 32 bits for arbitrary primes. Note that there are special primes of odd sizes such as P521. These special primes are enumerated, since there are a just a handful of them and they can be operated on with very simple reduction techniques (using simple ALU instructions). The enumerated primes are from the NIST curves include:

1. P-192
2. P-224
3. P-256 // Critical one, as this is ~ security RSA3K
4. P-384
5. P-521

Thus the sizes of the special curves can be represented by a table sp_sizes[ ]={192, 224, 256, 384, 521, . . . } We can define an efficient operand type/size field in the immediate byte. One example encoding is as follows:

imm8[7] if 1, special primes are enumerated in field imm8[3:0]
tmp=192+(32* imm8[3:0]) // covers sizes in multiples of 32-bits from 192-672
size=imm8[7]? (sp_sizes[imm8[3:0]]) : tmp In one embodiment, each operand is stored in memory "encrypted" by a special process such that software cannot decrypt the contents. Decryption can only be done during the ECC point-multiplication process by a special circuit in the hardware using a secret processor key.

One operand (p) is a pointer to an "encrypted" memory region containing the (prime) modulus. It may be optional to encrypt p, since for the special enumerated curves, the prime is known. Another operand (k) is an "encrypted" memory region containing the scalar multiplier operand. A third operand (B) is an "encrypted" memory region containing the base-point (pair of x and y coordinates) as input, and is overwritten by the result. The result is written back without special encryption since it needs to be processed by normal software.

The ECC point-multiplication with obfuscated input information instruction 102 may first decrypt the memory buffers that hold the source operands, using a secret hidden processor key. The retrieved key can never be seen by general software, and will only be used within the scope of the instruction's execution. Since the instruction is specified with a variable operand size, and each instruction can be ~100k+ cycles of processing, the micro-architecture should support being interrupted and resuming execution of the instruction. However, care needs to be taken to ensure that partial state that needs to be saved and restored can never be misused by software (e.g. by ensuring a special save region that is encrypted, possibly by the same hidden processor key), so that the instruction is ultra-secure and not reveal any partial information that is dependent on the operands.

Note that in some algorithms some operands are public such as the modulus. In Diffie-Hellman phase-1, the point is also published (the generator base-point of the ECC group), whereas in phase-2 it needs to be held secret. In such cases, it would be wasteful to encrypt the information that is public. So, we can extend the scheme to have a bit that says which operand is encrypted and which one is raw.

One or more of the operands may be stored in memory "encrypted" by a special process such that software cannot decrypt the contents. Decryption may be done during the point-multiplication process by a special circuit in the hardware using a secret processor key.

To further illustrate certain concepts, it may be helpful to consider a few possible implementation algorithms for ECC point-multiplication. One possible algorithm for implementing scalar point multiplication (e.g., k*B) is shown in the following pseudo-code:

xB, yB=coordinates for point B
t-bit prime p
k=$(k_{t-1} \ldots k_1 k_0)_2$
Initialize Q=∞
For i from 0 to t−1
Q=k*B
B=2B // Point-double
If $k_i$=1
Q=Q+B // Point-add
Return Q As shown, the scalar multiplier may be represented by its individual bits ($k_i$), where $k_i$ ranges from $k_0$ through $k_{t-1}$. The value for Q may be the product of the scalar multiplier k and the base point B. Initially, a value Q may be set equal to co. Then, the value Q may be updated during each oft (e.g., 1024) iterations of a loop. For each of the t iterations, a point double is performed (i.e., the value B is updated to be equal to the product of itself and two (i.e., B=2B)). For each of the t iterations, when the corresponding scalar multiplier bit for the loop (i.e., $k_i$) is set to binary one (i.e., when $k_i$=1), a point add is performed (i.e., the value Q is updated to be equal to itself plus B (i.e., Q=Q+B)). At the end of the loop, the value of Q is returned as the result of the ECC point-multiplication. This algorithm for implementing ECC point-multiplication may optionally be used if desired.

However, the implementation of this algorithm may tend to be slow. For one thing, the modulo operations used inside the point-add and point-double generally may be slow to implement. Representatively, these operations may be implemented with division-like operations, which generally take a relatively long time to compute, at least as compared to other types of operations like multiplications. In addition, such modulo operation(s) need to be performed within each iteration of the loop, of which there may be many (e.g., tin this example, or in some cases even more). Accordingly, although this algorithm is suitable for implementing the ECC point-multiplication according to some embodiments, often it may be desirable to use an ECC point-multiplication algorithm that uses special modular reduction schemes in order to achieve faster performance. In one embodiment, the ECC curves are defined with special primes (e.g., NIST p256) where reduction can be done fast without any division. In another embodiment, before the main loop starts, modular reduction (e.g., Montgomery reduction) can be done with a series of simple ALU instructions.

FIG. 3 is a block flow diagram of an example embodiment of a detailed method 335 of performing an embodiment of an ECC point-multiplication with obfuscated input information instruction 102 with Montgomery reduction. In various embodiments, the method may be performed by a processor, instruction processing apparatus, or other digital logic device. In some embodiments, the method 335 may be performed by and/or within the processor 100 of FIG. 1. The components, features, and specific optional details described herein for the processor 100, also optionally apply to the method 335. Alternatively, the method 335 may be performed by and/or within a different processor or apparatus. Moreover, the processor 100 may perform different methods than the method 335.

The method includes receiving the ECC point-multiplication with obfuscated input information instruction 102, at block 336. The instruction may specify or otherwise indicate one or more source operands storing an optionally obfuscated base point (B), an optionally obfuscated scalar multiplier (k), an optionally obfuscated modulus (p), optionally one or more optionally obfuscated reduction constants used in the Montgomery reduction, or any combination thereof representing at least sufficient input to the Montgomery reduction algorithm. Embodiments contemplate obfuscating any combination of such input information ranging from none of it to all of it.

Then, at block 337, any optional obfuscated input information, if there is any for the particular embodiment, may be de-obfuscated. The de-obfuscation may be performed using any of the approaches and/or in any of the ways described elsewhere herein.

Then, at block 338, any of the needed reduction constants of the Montgomery reduction, if they were not already provided as pre-calculated reduction constants in the input information provided by the source operand(s), may be calculated. Alternatively, one or more of the reduction constants may optionally be provided as pre-calculated constants in the input information provided by the source operand(s). This may help to avoid needing to calculate these reduction constants within the confines of the execution of the instruction. In some embodiments that use an operand-size (e.g., 1024-bit operands), the method may use two reduction constants (R2 and μ) defined by the Montgomery reduction as functions of the modulus (p). The value of R2 may be calculated by the equation $R2=2^{(2*operand-size)}$ modulo p. The value of mu may be calculated by the equation $\mu=-p^{-1}$ modulo ($2^{64}$).

Next, at block 339, ECC point-multiplication calculations may be performed with Montgomery reduction using the reduction constants R2 and μ. These equations are used to pre-compute prior to the loop and transforming xB, yB to Montgomery space. Then, the value Q may be updated during each of iterations of the loop. As opposed to the non-Montgomery implementation described above, there is no need to perform division-like operations and thereby improve performance.

At the end of the loop, a Montgomery reduction is performed on the final value Q (i.e., transform Q back from Montgomery space before returning Q). This represents the ECC point-multiplication result 122.

Referring again to FIG. 3, at block 340, the ECC point-multiplication result 122, as calculated by the Montgomery reduction, may be stored in the destination storage location indicated by the instruction. Any of the destination storage locations described elsewhere herein are suitable.

The aforementioned method represents just one illustrative example embodiment of a method of performing an ECC point-multiplication with obfuscated input information instruction 102 with Montgomery reduction. Other methods are also contemplated and will be apparent to those skilled in the art and having the benefit of the present disclosure. For example, the illustrated method was based on a base point, scalar multiplier, and modulus, although in other embodiments the base point, scalar multiplier, and modulus may have various other power-of-two sizes, ranging over several orders of magnitude (e.g., may range from 256-bits to on the order of 16,384 bits). As another example, the illustrated method was based on a word-level Montgomery reduction algorithm that uses a word size of 64-bits, although in other embodiments a 32-bit or other word size may optionally be used. In addition, the method has been described in a relatively basic form, but operations may optionally be added to and/or removed from the method. In addition, the particular order of operations is not required, but rather certain operations may optionally be performed in other orders and/or overlapped.

One specific example embodiment of a suitable ECC point-multiplication with obfuscated input information, named ECC_POINT_MUL_LOCKED, is illustrated in the pseudocode below.

ECC_POINT_MUL_LOCKED{
// in and out
SrcDst R3//point to memory containing optionally "encrypted" point and result (each as a pair of affine x:y coordinates)
//input information
imm8
Src1 R1// pointer to memory containing optionally "encrypted" scalar multiplier
//src2 is optional and not needed for special curves using enumerated primes
Src2 R2 // pointer to memory containing optionally "encrypted" prime modulus
// de-obfuscate base point, modulus, and scalar multiplier
{xB || yB}=(imm8[4])? de-obfuscate (Srcdst): *srcdst
k=(imm8[5])? de-obfuscate (Src1): *src1
If (imm8[7]) p=get-enumerated-prime(imm8[3:0])
Else p=(imm8[6])? de-obfuscate (Src2): *src2
//optionally signal fault if de-obfuscation fails
Find index of first set msb in k as X
Transform-coordinates-affine-to-jacobian(B) // optional, for performance
Initialize Q=∞
For i from 0 to X
B=2B // Point-double
If $k_i$=1
Q=Q+B // Point-add
Transform-coordinates-jacobian-to-affine(Q) // optional, for performance *srcdst=Q The ECC_POINT_MUL_LOCKED instruction may explicitly specify or implicitly indicate a first register (R1), for example a first 64-bit general-purpose register, that is to store an effective address, pointer, or other indication of a location in memory that is to store a first source operand (Src1) having an obfuscated scalar multiplier. The instruction may also explicitly specify or implicitly indicate a second register (R2), for example a second 64-bit general-purpose register, that is to store an effective address, pointer, or other indication of a location in memory that is to store a second source operand (Src2) having an obfuscated modulus. The instruction may also explicitly specify or implicitly indicate a third register (R3), for example a third 64-bit general purpose register, that is to store an effective address, pointer, or other indication of a location in memory that is to store a source-destination operand (SrcDst) initially having an obfuscated base point, and upon completion of the instruction serving as a destination storage location where an ECC point-multiplication result is to be stored. Alternatively, any of the various other ways of indicating the source and/or destination operands disclosed elsewhere herein may optionally be used instead.

In one embodiment, all of the base point, scalar multiplier, and modulus are obfuscated. Alternatively, in other embodiments, any one or more including any combination of the base point, scalar multiplier, and modulus may optionally be obfuscated. The instruction may control or otherwise cause an execution unit to de-obfuscate the obfuscated base point, scalar multiplier, and modulus. Any of the de-obfuscation approaches mentioned elsewhere herein are suitable (e.g., one of the approaches described below for FIGS. 6-8). As one illustrative example, the execution unit may decrypt encrypted input information using a secret processor cryptographic key. A fault may optionally be signaled if any of the de-obfuscations or operations to retrieve operands fail (e.g. if the encrypted buffers have a form of integrity check associated with them that fail). In such a case, no output will be computed.

In one embodiment, the Montgomery reduction constants are not provided as input through the source operands, therefore the instruction may control or otherwise cause the execution unit to calculate the Montgomery reduction constants. Specifically, the R2 and U constants may be calculated within the performance of the instruction. Representatively, these constants may be pre-calculated once per ECC point-multiplication operation/instruction. Then, the instruction may control or otherwise cause the execution unit to perform the Montgomery reduction of ECC point-multiplication calculations utilizing the reduction constants. Finally, the execution unit, responsive to the instruction, may store an ECC point-multiplication result in the destination storage location (e.g., in this case SrcDst).

Another specific example embodiment of a suitable ECC point-multiplication with obfuscated input information, named MODEXP_LOCKED2, is illustrated in the pseudocode below.

ECC_POINT_MUL_LOCKED2 {
// input information
Src1 R1 // register storing pointer to memory location having obfuscated N||R2||U
Src2 R2 // register storing pointer to memory location having obfuscated scalar multiplier
SrcDst R3 // register storing pointer to memory location having obfuscated base point
// de-obfuscate base point, modulus, and scalar multiplier
N||R2||U=de-obfuscate (Src1) // optionally signal fault if de-obfuscation fails
k=de-obfuscate (Src2) // optionally signal fault if de-obfuscation fails
B=de-obfuscate (SrcDst) // optionally signal fault if de-obfuscation fails
// no need to calculate Montgomery reduction constants since precomputed
// perform ECC point-multiplication
Initialize Q=∞
For i from 0 to X
B=2B // Point-double
If $k_i$=1
Q=Q+B // Point-add
*SrcDst=Montgomery-Reduce(Q)
}

The ECC_POINT_MUL_LOCKED2 instruction is similar to the ECC_POINT_MUL_LOCKED 1 instruction. The discussion and variations mentioned above for the ECC_POINT_MUL_LOCKED 1 instruction also optionally apply to the ECC_POINT_MUL_LOCKED2 instruction. One difference however, is that the ECC_POINT_MUL_LOCKED2 instruction provides the R2 and U reduction constants as input through the source operands (e.g., as pre-calculated constants). In the illustrated embodiment, the reduction constants are optionally concatenated (e.g., as shown by symbol ||) or otherwise provided along with the modulus, although this is not required. The reduction constants are derivable from the modulus so there is some benefit to keeping them in the same source operand.

However, in other embodiments, the reduction constants may be provided by other source operands and/or multiple source operands. Since the reduction constants are provided as input, there is no need for the execution unit to calculate these reduction constants as part of the operation of the instruction. Rather, the reduction constants may be de-obfuscated, if they are obfuscated, as for the other input parameters. In some embodiments, if the modulus is obfuscated, then the reduction constants may also be obfuscated, whereas if the modulus is not obfuscated, then the reduction constants may not be obfuscated.

Another example of a suitable reduction algorithm for ECC point-multiplication is Barrett reduction. Other embodiments pertain to a method similar to that shown in FIG. 3, except where a Barrett reduction constant is used, and a Barrett reduction algorithm is used to perform the ECC point-multiplication. In some embodiments, the method may use a reduction constant defined by the Barrett reduction as functions of the modulus (p) as shown in the equation $U = \text{floor}(2^{2048}/p)$.

The Barrett-multiplication of 2 numbers X and Y may be performed as Barrett-reduction(X*Y, p, U). This may also be performed similarly for the square operation. Note this is somewhat similar to a Montgomery-multiply of two numbers, which may be done as a regular multiplication of the two numbers followed by a Montgomery-reduce.

The Barrett reduction has certain similarities to the Montgomery reduction previously described. It is to be appreciated that the features and optional variations described for Montgomery reduction also optionally apply to Barrett reduction, unless stated otherwise, or unless otherwise clearly apparent (e.g., unless they are incompatible with Barrett reduction).

Yet another specific example embodiment of a suitable ECC point-multiplication with obfuscated input information, named ECC_POINT_MUL_LOCKED3, is the same as that shown above for ECC_POINT_MUL_LOCKED1 except that the Barrett reduction constants and calculations are used instead of the Montgomery reduction constants and calculations. A still further specific example embodiment of a suitable ECC point-multiplication with obfuscated input information, named ECC_POINT_MUL_LOCKED4, is the same as that shown above for ECC_POINT_MUL_LOCKED2 except that the Barrett reduction constants and calculations are used instead of the Montgomery reduction constants and calculations.

FIG. 4 is a block diagram of an example embodiment of an ECC point-multiplication with obfuscated input information instruction 402. The instruction includes an operation code or opcode 442. The opcode may represent a plurality of bits, or one or more fields, that are operative to identify the instruction and/or the operation to be performed (e.g., an ECC point-multiplication with obfuscated input information operation).

The instruction also includes a first source indication field 444, a second source indication field 446, and a third source/destination indication field 448. These source indication fields may be used to specify or otherwise indicate source storage locations for source operands used to provide input parameters and/or optionally obfuscated input parameters. The instruction may include at least one field indicating whether a corresponding portion of the input information for the ECC point-multiplication operation is obfuscated. In one embodiment, the source operands store one or more obfuscated secret input parameters and one or more non-obfuscated public input parameters. By way of example, each of these fields may include bits to specify an address of a register, memory location, or other storage location for the associated operand. In other embodiments, fewer or more source and/or destination indication fields may be used. For example, input information may optionally be provided in a single larger memory location. As another example, one or more of these storage locations may optionally be implicit or inherent to the instruction (e.g., the opcode), rather than being specified. Further, if desired an additional separate destination indication field may optionally be used instead of having the third field be a source/destination indication field.

In some embodiments, the instruction may also optionally have an operand size indication field 450. The operand size indication field may allow a size of the source operands to be specified or indicated. This may help to provide flexible or variable, and architecturally programmable or configurable, sized operands to be used. In some embodiments, a single size field may be used to specify or otherwise indicate a single size for all of the source operands, although the scope of the disclosure is not so limited. In some embodiments, in order to provide a relatively high level of flexibility, the instruction may allow the operand size to be configured to range from around 256-bits to around 16,000-bits, although the scope of the disclosure is not limited to any known size. Alternatively, fixed size operands may optionally be used, if desired, and the operand size indication field may optionally be omitted. By way of example, a fixed sufficiently large operand size may optionally be used to accommodate the sizes of operands expected to be used for the particular implementation and any unused bits not occupied by smaller operands may optionally be filled with zeros.

In some embodiments, the instruction may also optionally have one or more operand obfuscation indication fields 452. Each of the one or more operand obfuscation indication fields may be used to indicate whether a corresponding operand is optionally obfuscated or not. By way of example, in some embodiments, there may be a first operand obfuscation indication field or set of one or more bits to indicate whether or not a first operand (e.g., to be used to store a base point) is obfuscated, there may be a second operand obfuscation indication field or set of one or more bits to indicate whether or not a second operand (e.g., to be used to store a scalar multiplier) is obfuscated, and there may be a third operand obfuscation indication field or set of one or more bits to indicate whether or not a third operand (e.g., to be used to store a modulus) is obfuscated.

Alternatively, the opcode of the instruction may optionally fix which operands (e.g., which of a base point, scalar multiplier, and modulus) are obfuscated. For example, different opcode instructions may optionally be provided for different combinations of the base point, scalar multiplier, and modulus being obfuscated, all of them being modulated, and none of them being modulated, to name a few examples. Advantageously, this may help to allow a programmer to configure or specify which operands are obfuscated so that operands desired to be secure can be secured, whereas other operands not desired to be secured need not be de-obfuscated. As one example, in some algorithms, such as DSA and Diffie-Hellman, some operands are public such as the modulus (e.g., NIST published primes). In Diffie-Hellman phase-1, the base is also published or public, whereas in phase-2 it needs to be secret or private. In some cases, better performance may be achieved by not obfuscating and needing to de-obfuscate the information that is public.

This is just one illustrative example of a suitable instruction. Alternate embodiments may include a subset of the illustrated fields and/or may add additional fields. The illustrated arrangement of the fields is not required, rather the fields may be rearranged variously.

Moreover, each of the fields may either consist of a contiguous set of bits, or may include noncontiguous or separated bits that logically represent the field.

Figure 5:
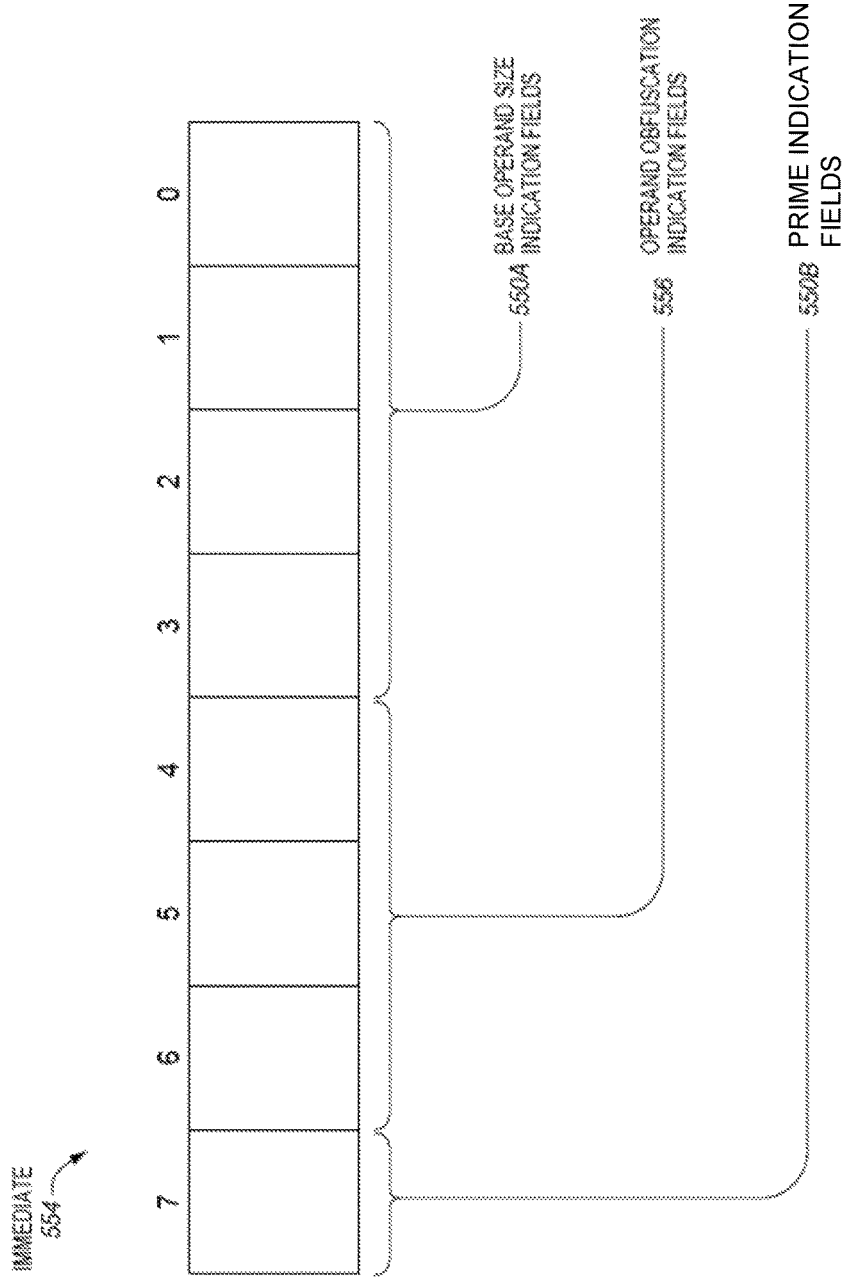
FIG. 5 is a block diagram of an immediate, according to one embodiment.

FIG. 5 is a block diagram of an example embodiment of an immediate 554 having an example embodiment of an operand size indication field 550 and an example embodiment of operand obfuscation indication fields 556. In this embodiment, the immediate is an 8-bit immediate, although a larger or smaller immediate may optionally be used.

Bits [3:0] of the immediate represent a base operand size indication field 550A. Alternatively, fewer or more bits may be used to represent the base operand size potentially as an offset from a minimum operand size. Bit [7] of the immediate represents a prime indication field 550B. In some embodiments, the base operand size indication field 550A may specify a base size for the operands, and the prime indication field 550B may indicate whether a known set of primes (e.g., NIST, etc.) is used or if the prime is being specified explicitly in the instruction. By way of example, in one implementation, the bits [3:0] may be shifted left by one bit to determine the base size, and if bit [7] is set to binary one, a known set of primes may be used.

Otherwise, if bit [7] is cleared to binary zero, the prime may be specified explicitly from the instruction.

Bits [6:4] of the immediate represent three operand obfuscation indication fields 556. Each of these fields may be used to indicate whether a different corresponding one of three source operands is obfuscated. As one illustrative example, bit [6] may correspond to a source operand to store the modulus, bit [5] may correspond to a source operand to store the scalar multiplier, and bit [4] may correspond to a source operand to store the base point. Alternatively, these bits may be allocated to the base point, scalar multiplier, and modulus in different ways. One value (e.g., binary one) of each of bits [6:4] may indicate that the corresponding source operand is obfuscated, whereas another value (e.g., binary zero) may indicate that the corresponding source operand is not obfuscated. One potential advantage of such per-operand obfuscation indication fields is enhanced flexibility. For example, some uses may have a given one of the scalar multiplier, modulus, and base point as a secret, whereas other uses may have the same given one as public or private, and the corresponding operand obfuscation indication field may allow a programmer to either obfuscate or not obfuscate the given one to either achieve more security or avoid unnecessary de-obfuscations that make tend to reduce performance.

A further specific example embodiment of a suitable ECC point-multiplication with obfuscated input information, named ECC_POINT_MUL_LOCKED5, is illustrated in the pseudocode below.

ECC_POINT_MUL_LOCKED5 {
  // input information
  Src1 R1 // register with pointer to memory location with optionally obfuscated modulus
  Src2 R2 // register with pointer to memory location with optionally obfuscated scalar multiplier
  SrcDst R3 // register with pointer to memory location with optionally obfuscated base point
  imm8
  // de-obfuscate base point, modulus, and scalar multiplier
  p=(imm8[6])? de-obfuscate (Src1): *Src1 // optionally signal fault
  k=(imm8[5])? de-obfuscate (Src2): *Src2 // optionally signal fault
  B=(imm8[4])? de-obfuscate (SrcDst): *SrcDst // optionally signal fault
  // calculate Montgomery reduction constants
  R2=$2^{2048}$ mod N
  U=-N-1 mod ($2^{64}$)
  // perform ECC point-multiplication
  Initialize Q=∞
  For i from 0 to X
  B=2B // Point-double
  If $k_i$=1
  Q=Q+B // Point-add
  *SrcDst=Montgomery-Reduce(Q)
}

The ECC_POINT_MUL_LOCKED5 instruction is similar to the ECC_POINT_MUL_LOCKED1. The discussion and variations mentioned above for the ECC_POINT_MUL_LOCKED1 instruction also optionally apply to the ECC_POINT_MUL_LOCKED5 instruction. One difference however, is that the ECC_POINT_MUL_LOCKED5 instruction allows each of the source operands (Src1, Src2, and SrcDst) to be optionally obfuscated (e.g., programmable configuration). Only those obfuscated parameters need to be de-obfuscated.

Yet another specific example embodiment of a suitable ECC point-multiplication with obfuscated input information, named ECC_POINT_MUL_LOCKED6, is the same as that shown above for ECC_POINT_MUL_LOCKED3 except that it uses the same immediate and obfuscation configurability as the ECC_POINT_MUL_LOCKED5 instruction. A further specific example embodiment of a suitable ECC point-multiplication with obfuscated input information, named ECC_POINT_MUL_LOCKED7, is the same as that shown above for ECC_POINT_MUL_LOCKED4 except that it uses the same immediate and obfuscation configurability as the ECC_POINT_MUL_LOCKED5 instruction.

Figure 6:
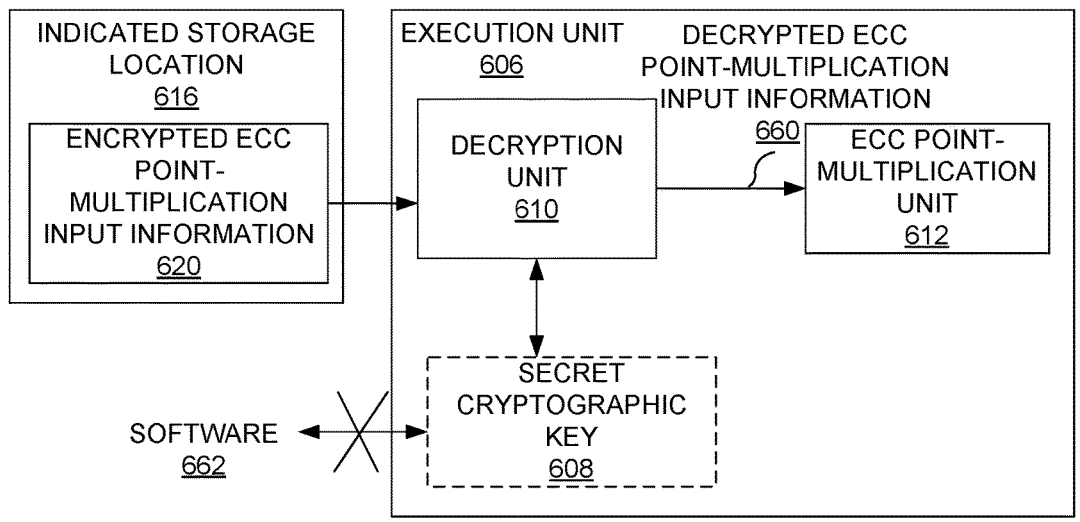
FIG. 6 is a block diagram of an execution unit, according to one embodiment.

FIG. 6 is a block diagram of an embodiment of an execution unit 606 that is operative to decrypt actual ECC point-multiplication input information 660 from encrypted ECC point-multiplication input information 620 responsive to an ECC point-multiplication with encrypted input information instruction 102. The encrypted input information 620 is an example of obfuscated input information. The encrypted input information is stored in a storage location 616 (e.g., a register or memory location) that may be specified or otherwise indicated by the instruction. The execution unit 606 includes a decryption unit 610. The execution unit 606 and/or the decryption unit 610 may be coupled to receive the encrypted input information 620. The decryption unit 610 and/or the execution unit 606 may also be coupled to receive a secret cryptographic key 608. The secret cryptographic key 608 is accessible and available to the decryption unit 610 and/or the execution unit 606, but is not accessible to, or at least not readable by, software 662 (e.g., even the most highly privileged system software). In some embodiments, initially the secret cryptographic key 608 may have been written or stored into the processor by software, but subsequently the software 662 may not be able to read it. In the illustrated embodiment, the secret cryptographic key 608 is part of the execution unit 606. In other embodiments, the secret cryptographic key 608 may instead be separate from the execution unit 606, but coupled with the execution unit 606 and/or the decryption unit 610 (e.g., stored in a key locker of the processor).

The decryption unit 610 may receive the secret cryptographic key 608 and may be operative to use the secret cryptographic key 608 to decrypt the encrypted input information 620 into the decrypted ECC point-multiplication input information 660. Various different decryption algorithms known in the art are suitable, such as, for example, Advanced Encryption Standard (AES), Data Encryption Standard (DES), triple DES (3DES), Rivest Cipher 4 (RC4), and other block/stream ciphers. An ECC point-multiplication unit 612 is coupled with the decryption unit 610, and may receive the decrypted input information 660. The ECC point-multiplication unit may use the decrypted input information to compute an ECC point-multiplication result, as described elsewhere herein. Advantageously, the actual input information 660 used in the ECC point-multiplication calculations may be generated by the execution unit 606 and/or its processor responsive to the instruction, but this actual input information may never be resident in an architectural register of the processor, or a memory location, or any other architecturally visible storage location, or otherwise readable readable by the software 662.

Figure 7:
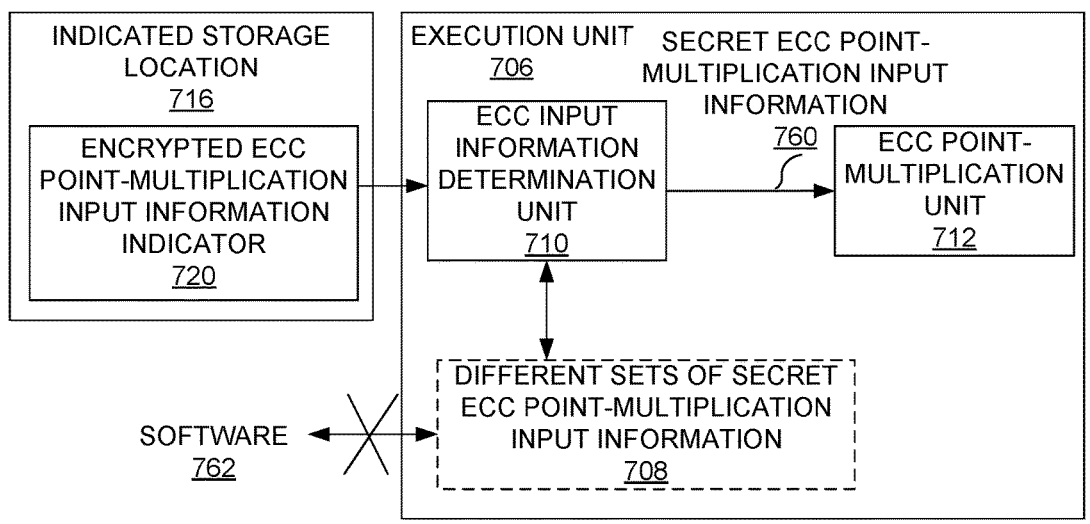
FIG. 7 is a block diagram of an execution unit, according to another embodiment.

FIG. 7 is a block diagram of an embodiment of an execution unit 706 that is operative to determine secret ECC point-multiplication input information 760 from an ECC point-multiplication input information indicator 720 responsive to an ECC point-multiplication with obfuscated input information instruction 102. The input information indicator 702 is an example of obfuscated input information. The indicator 720 may broadly represent any of a wide variety of different types of information or values that may be used to select, identify, or otherwise indicate a set of secret actual input information. The indicator 720 may be stored in a storage location 716 (e.g., a register or memory location) that may be specified or otherwise indicated by the instruction.

The execution unit 706 includes an ECC point-multiplication input information determination unit 710, which is also referred to herein simply as a determination unit 710. The execution unit 706 and/or the determination unit 710 may be coupled to receive the input information indicator 720. The determination unit 710 and/or the execution unit 706 may also be coupled to different sets of secret ECC point-multiplication input information 708. The different sets of secret ECC point-multiplication input information 708 represents a secret that is accessible and available to the determination unit 710 and/or the execution unit 706, but is not accessible or available to software 762 (e.g., even the most highly privileged system software). In the illustrated embodiment, the different sets of secret input information 708 are part of the execution unit 706. In other embodiments, the different sets of secret input information 708 may instead be separate from the execution unit 706, but coupled with the execution unit 706 and/or the determination unit 710. The determination unit 710 may be operative to use the indicator 720 to determine or obtain a set of secret input information 760 from the different sets of secret input information 708.

The determination unit 710 may use the indicator 720 to determine the secret input information 708 in different ways in different embodiments. In some embodiments, the different sets of secret input information 708 may be ordered in a list, table, array, or other ordered arrangement. The indicator 720 may represent an index, offset, number, or other indicator to select or indicate a particular set of secret input information. For example, an indicator 720 of value eight may select secret input information 708 in the eighth entry of an array. In other embodiments, the indicator 720 may be an identifier. The different sets of secret input information 708 may not necessarily be arranged in any particular order. However, each of the different sets of secret input information 708 may have a different corresponding unique identifier. For example, a first set may have an identifier "00000000," a second set may have an identifier "00000010," a third set may have an identifier "01000000," and so on. The identifier may be matched to an identifier of the set of secret input information 708 in order to select or indicate that set of secret input information 708. These are just a few illustrative examples. Other ways of using an indicator to determine a secret set of input information 708 are contemplated and will be apparent to those skilled in the art and having the benefit of the present disclosure.

An ECC point-multiplication unit 712 is coupled with the determination unit 710, and may receive the secret input information 760. The ECC point-multiplication unit 712 may use the secret input information 708 to compute an ECC point-multiplication result as described elsewhere herein. Advantageously, the secret input information 708 may be generated by the execution unit and/or its processor responsive to the instruction, but may never be readable by the software 762.

Figure 8:
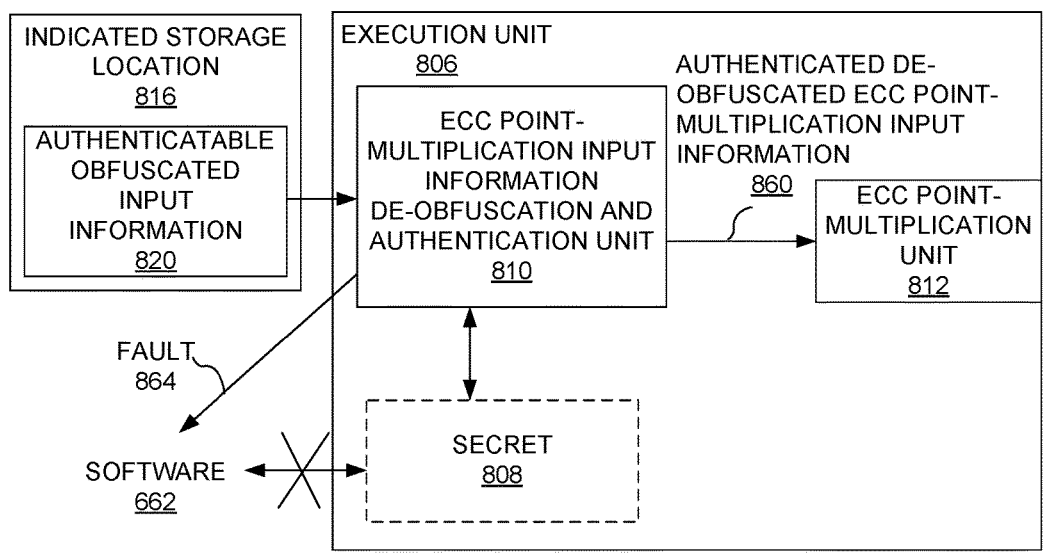
FIG. 8 is a block diagram of an execution unit, according to another embodiment.

FIG. 8 is a block diagram of an embodiment of an execution unit 806 that is operative to determine de-obfuscated and authenticated ECC point-multiplication input information 860 from authenticatable obfuscated input information 820 responsive to an ECC point-multiplication with obfuscated input information instruction 102. The authenticatable obfuscated input information 820 is stored in a storage location 816 (e.g., a register or memory location) that may be specified or otherwise indicated by the instruction. The input information 820 is also authenticatable in addition to being obfuscated. In some embodiments, such authentication may be achieved by adding additional bits (e.g., authentication or integrity check bits) to the obfuscated input information.

The execution unit 806 includes an ECC point-multiplication input information de-obfuscation and authentication unit 810. This unit is also referred to herein simply as the de-obfuscation and authentication unit 810. The execution unit 806 and/or the de-obfuscation and authentication unit 810 may be coupled to receive the authenticatable obfuscated input information 820. The de-obfuscation and authentication unit and/or the execution unit may also be coupled to a secret 808 that is not accessible, or at least not readable, by software 862 (e.g., even the most privileged system software). In the illustrated embodiment, the secret 808 is part of the execution unit 806. In other embodiments, the secret 808 may instead be separate from the execution unit 806, but coupled with the execution unit 806 and/or the de-obfuscation and authentication unit 810.

The de-obfuscation and authentication unit 810 may be operative to use the secret 808 and the authenticatable obfuscated input information 820 to obtain the authenticated de-obfuscated input information 860. The de-obfuscation may be performed as described elsewhere herein. In some embodiments, the authenticatable obfuscated input information 820 may include encrypted and authenticatable input information. By way of example, in some embodiments, a processor in which the execution unit 806 is included may have an encode key instruction in its instruction set. The processor may perform the encode key instruction to generate the authenticatable obfuscated input information 820 which includes the obfuscated input information plus additional authentication or integrity check information. Alternatively, a key wrap algorithm may optionally be used to provide the authenticatable and obfuscated input information 820. The de-obfuscation and authentication unit 810 may be operative to decrypt and authenticate such information using a secret or hidden cryptographic key.

The authentication may fail if the generated de-obfuscated input information is not what is expected and/or is inconsistent with the authentication information. In some embodiments, in the event of such a failed authentication, then the execution unit 806 may signal a fault 864. For example, the fault 864 may be delivered to the software 662 (e.g., a fault handler of an operating system). In such a case, the processor may stop performing the instruction without storing an output.

An ECC point-multiplication unit 812 is coupled with the de-obfuscation and authentication unit 810, and may receive the authenticated de-obfuscated input information 860. The ECC point-multiplication unit 812 may use the authenticated de-obfuscated input 860 information to compute an ECC point-multiplication result as described elsewhere herein. Advantageously, authentication or integrity check may be used along with obfuscation.

Other embodiments pertain to ECC point-multiplication instructions that do not indicate obfuscated input information and do not have the capability to obfuscate and de-obfuscate input information. These instructions may be similar to the other ECC point-multiplication instructions disclosed herein, except that, instead of indicating obfuscated input information, they are only able to indicate non-obfuscated input information. The non-obfuscated input information may be any of that mentioned elsewhere herein (e.g., the base point, scalar multiplier, and modulus actually used to perform the ECC point-multiplication). There may be no need to decrypt or otherwise de-obfuscate the input information, since it is not obfuscated and can be used directly in the ECC point-multiplication calculations. Aside from such obfuscation/de-obfuscation differences, the instructions may otherwise have similar or the same characteristics and variations as the other ECC point-multiplication instructions disclosed herein. Representatively, such instructions may be used in certain implementations where it may not necessary or sufficiently important to obfuscate the input information. For example, this may be the case where a cryptographic key is short lived (e.g., is only used for one or a few encryptions), where data to be encrypted is not sufficiently important to justify the obfuscation, where the instructions are used for non-cryptographic point-multiplications, etc. In such cases, there may be less benefit to obfuscating the input information, whereas some increase in performance may generally be obtained by avoiding needing to perform de-obfuscation.

Processor cores may be implemented in different ways, for different purposes, and in different processors. For instance, implementations of such cores may include: 1) a general purpose inorder core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 9A:
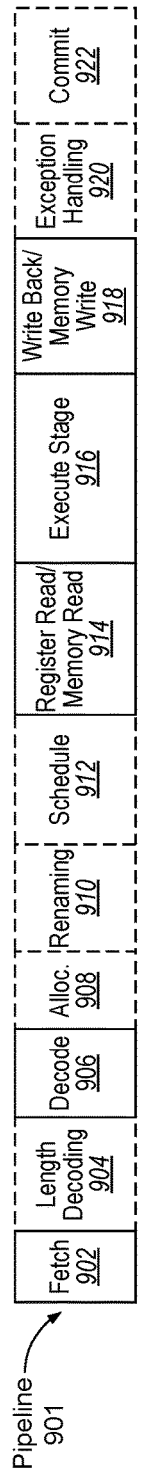
FIG. 9A is a block diagram illustrating an in-order pipeline and a register renaming out-of-order issue/execution pipeline, according to one embodiment.
Figure 9B:
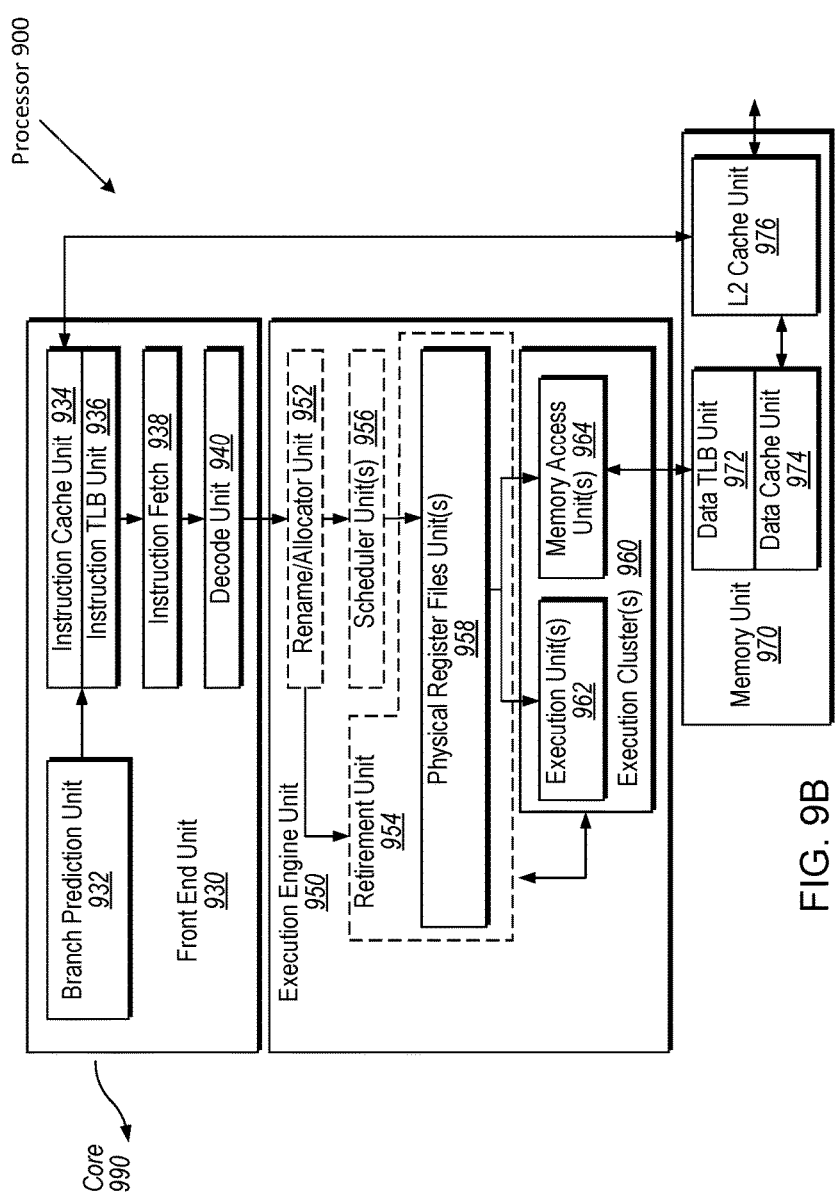
FIG. 9B is a block diagram illustrating a micro-architecture for a processor that implements ECC point-multiplication instructions, according to one embodiment.

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an inorder architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 901 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B is a block diagram illustrating a micro-architecture for a processor 900 that implements ECC point-multiplication with obfuscated input information instructions 102 according to one embodiment. Specifically, processor 900 depicts an in-order architecture core and a register renaming logic, out-of-order issue/execution logic to be included in a processor according to at least one embodiment of the disclosure. The embodiments of the ECC point-multiplication with obfuscated input information instructions 102 can be implemented in processor 900. In one embodiment, processor 900 is the processor 100 of FIG. 1.

Processor 900 includes a front end unit 930 coupled to an execution engine unit 950, and both are coupled to a memory unit 970. The processor 900 may include a core 990 that is a reduced instruction set computing (RISC) core, a complex instruction set computing (CISC) core, a very long instruction word (VLIW) core, or a hybrid or alternative core type. As yet another option, processor 900 may include a special-purpose core, such as, for example, a network or communication core, compression engine, graphics core, or the like. In another embodiment, the core 990 may have five stages.

The front end unit 930 includes a branch prediction unit 932 coupled to an instruction cache unit 934 (e.g., instruction cache 510), which is coupled to an instruction translation lookaside buffer (TLB) unit 936, which is coupled to an instruction fetch unit 938 (e.g., prefetch unit 508), which is coupled to a decode unit 940 (e.g., instruction decode unit 512). The decode unit 940 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations (RS), central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 958 is overlapped by the retirement unit 954 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which may include a data prefetcher, a data TLB unit 972, a data cache unit (DCU) 974, and a level 2 (L2) cache unit 976, to name a few examples. In some embodiments DCU 974 is also known as a first level data cache (L1 cache). The DCU 974 may handle multiple outstanding cache misses and continue to service incoming stores and loads. It also supports maintaining cache coherency. The data TLB unit 972 is a cache used to improve virtual address translation speed by mapping virtual and physical address spaces. In one exemplary embodiment, the memory access units 964 may include a load unit, a store address unit, and a store data unit, each of which is coupled to the data TLB unit 972 in the memory unit 970. The L2 cache unit 976 may be coupled to one or more other levels of cache and eventually to a main memory.

In one embodiment, the data prefetcher speculatively loads/prefetches data to the DCU 974 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 900 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10B:
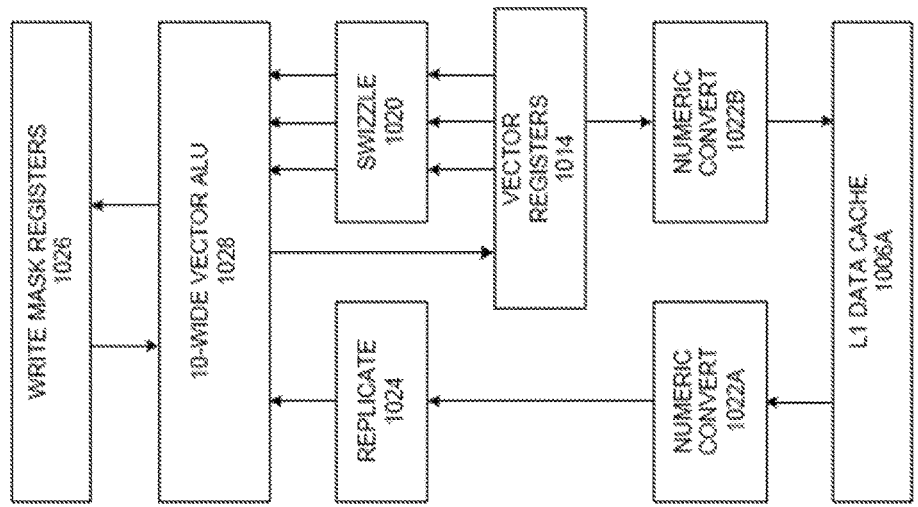
FIG. 10B is a block diagram of an expanded view of part of the processor core of FIG. 10A, according to one embodiment.
Figure 10A:
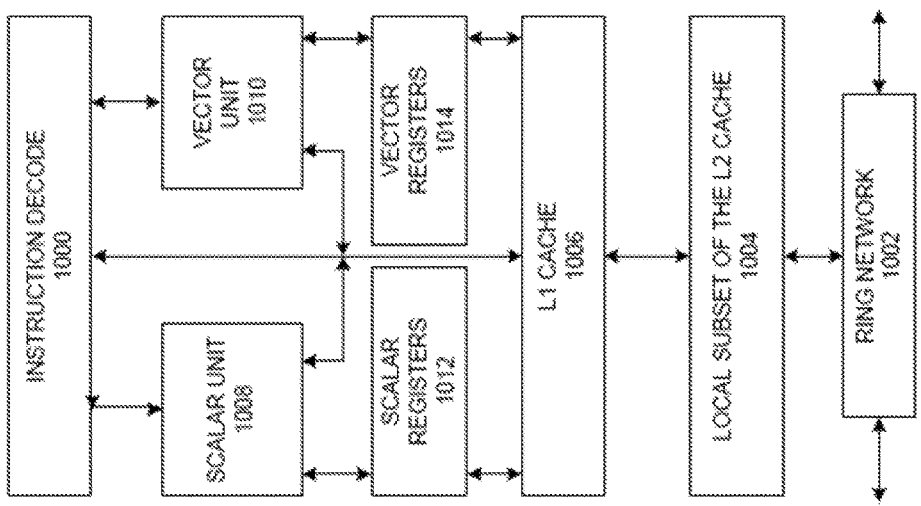
FIG. 10A is a block diagram of a single processor core, along with its connection to the on-die interconnect network, and with its local subset of the Level 2 (L2) cache, according to one embodiment.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decoder 1000 supports the x86 instruction set with a packed data instruction set extension. An L1 cache 1006 allows low latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
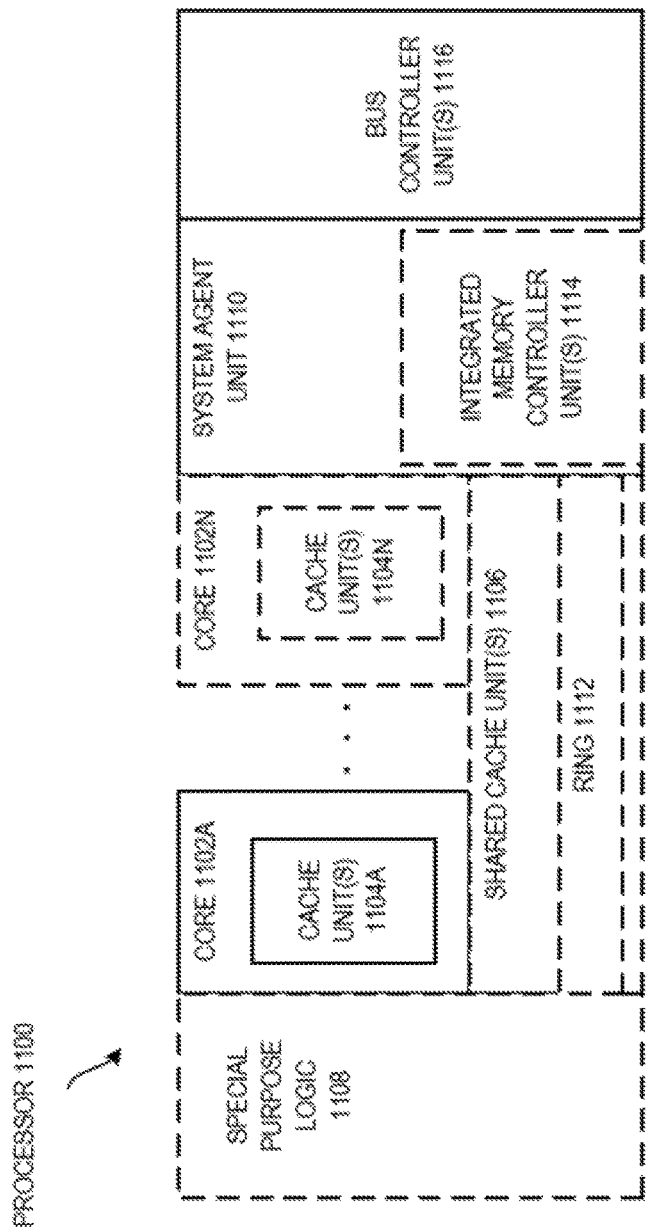
FIG. 11 is a block diagram of a processor that may have more than one core, may have an integrated memory controller, and may have integrated graphics, according to one embodiment.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more midlevel caches, such as level 2 (L2), level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

FIGS. 12-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
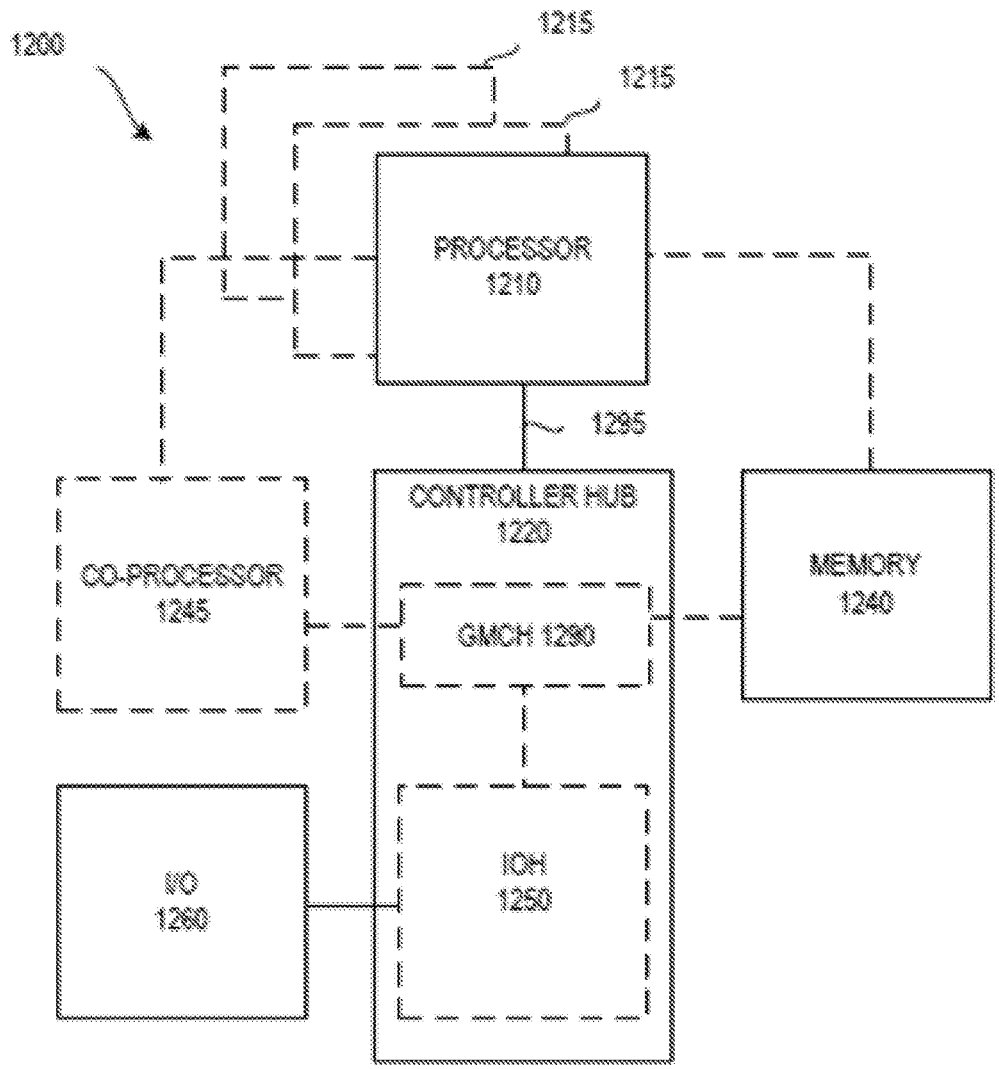
FIG. 12 is a block diagram of computer architecture, according to one embodiment.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources of processors 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
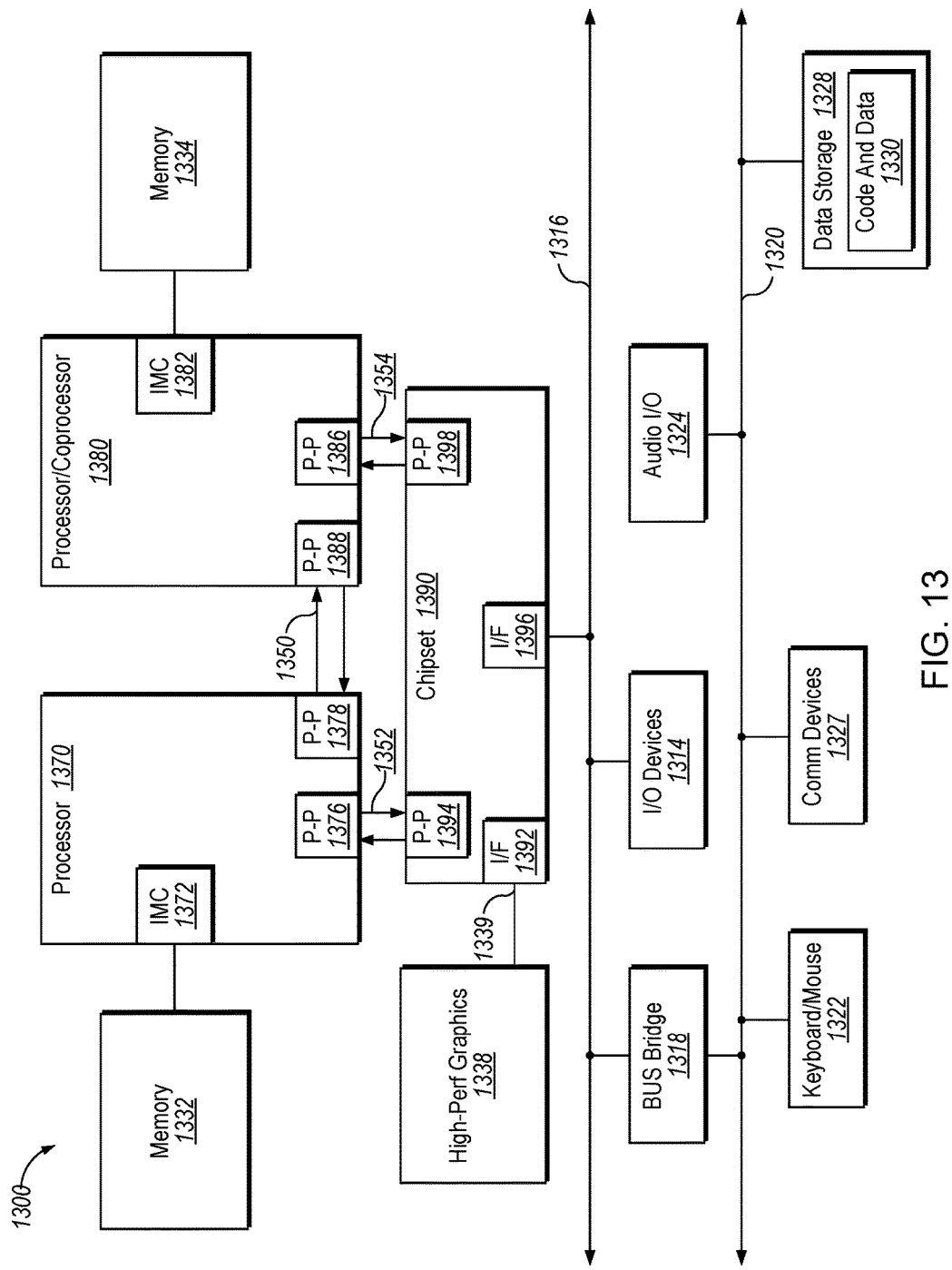
FIG. 13 is a block diagram of computer architecture, according to another embodiment.

Embodiments may be implemented in many different system types. Referring now to FIG. 13, shown is a block diagram of a multiprocessor system 1300 in accordance with an implementation. As shown in FIG. 13, multiprocessor system 1300 is a point-to-point interconnect system, and includes a first processor 1370 and a second processor 1380 coupled via a point-to-point interconnect 1350. As shown in FIG. 13, each of processors 1370 and 1380 may be multicore processors, including first and second processor cores (i.e., processor cores 1374a and 1374b and processor cores 1384a and 1384b), although potentially many more cores may be present in the processors. The processors each may include hybrid write mode logics in accordance with an embodiment of the present. The embodiments of the ECC point-multiplication with obfuscated input information instructions 102 can be implemented in the processor 1370, processor 1380, or both.

While shown with two processors 1370, 1380, it is to be understood that the scope of the present disclosure is not so limited. In other implementations, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1388; similarly, second processor 1380 includes P-P interfaces 1386 and 1388. Processors 1370, 1380 may exchange information via a point-to-point (P-P) interface 1350 using P-P interface circuits 1388, 1388. As shown in FIG. 13, IMCs 1382 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may also exchange information with a high-performance graphics circuit 1338 via a high-performance graphics interface 1339.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, second bus 1320 may be a low pin count (LPC) bus. Various devices may be coupled to second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to second bus 1320. Note that other architectures are possible. For example, instead of the point-to-point architecture of FIG. 13, a system may implement a multi-drop bus or other such architecture.

Figure 14:
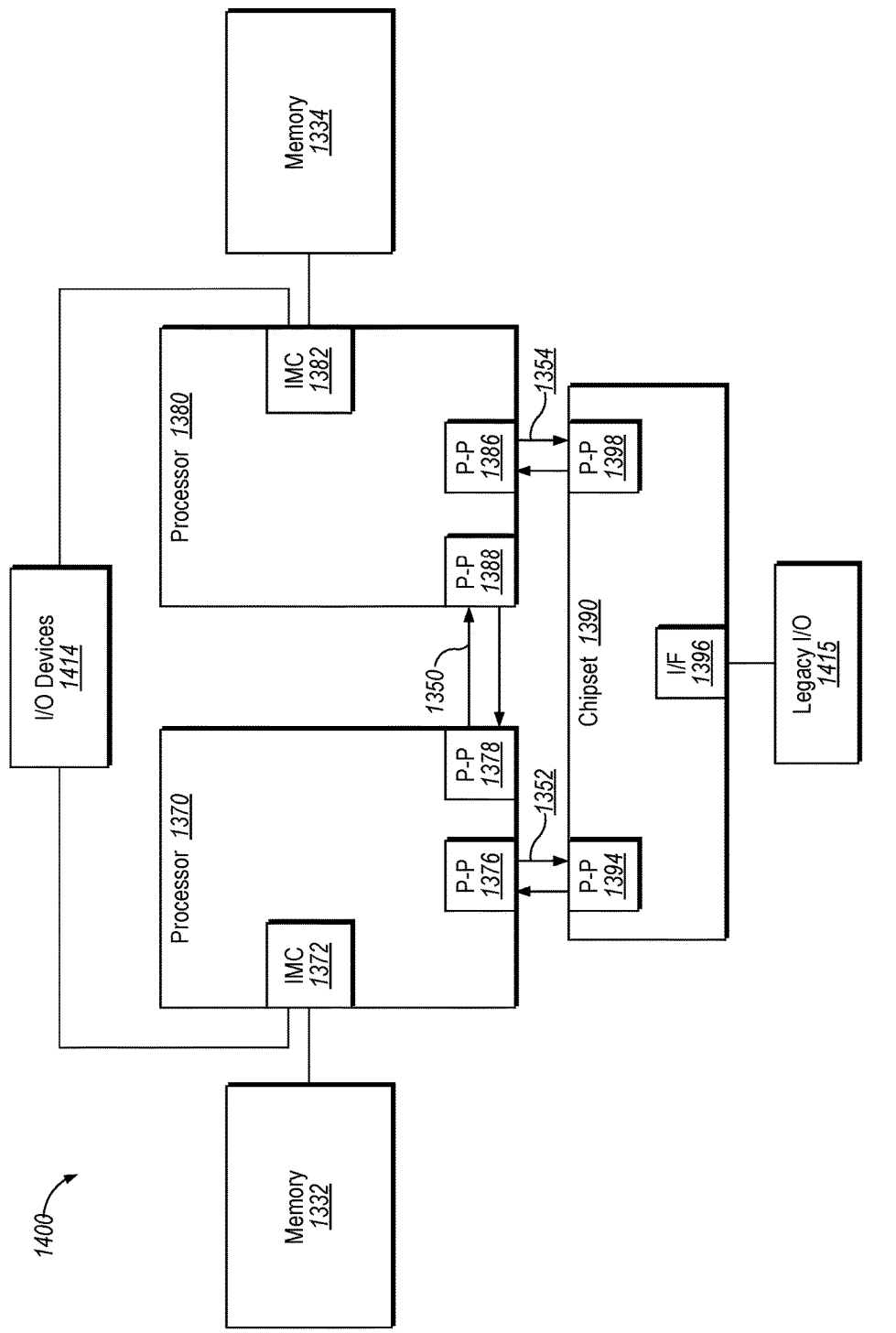
FIG. 14 is a block diagram of computer architecture, according to another embodiment.

Referring now to FIG. 14, shown is a block diagram of a third system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL"). For at least one embodiment, the CLs may include integrated memory controller units IMC, 1372 and 1382 such as described herein. In addition. CLs or IMC 1372, 1382 may also include I/O control logic. FIG. 14 illustrates that the memories 1332, 1334 are coupled to the IMC 1372, 1382, and that I/O devices 1414 are also coupled to the IMC 1372, 1382. Legacy I/O devices 1415 are coupled to the chipset 1390. The embodiments of the ECC point-multiplication with obfuscated input information instructions 102 can be implemented in processor 1370, processor 1380, or both.

Figure 15:
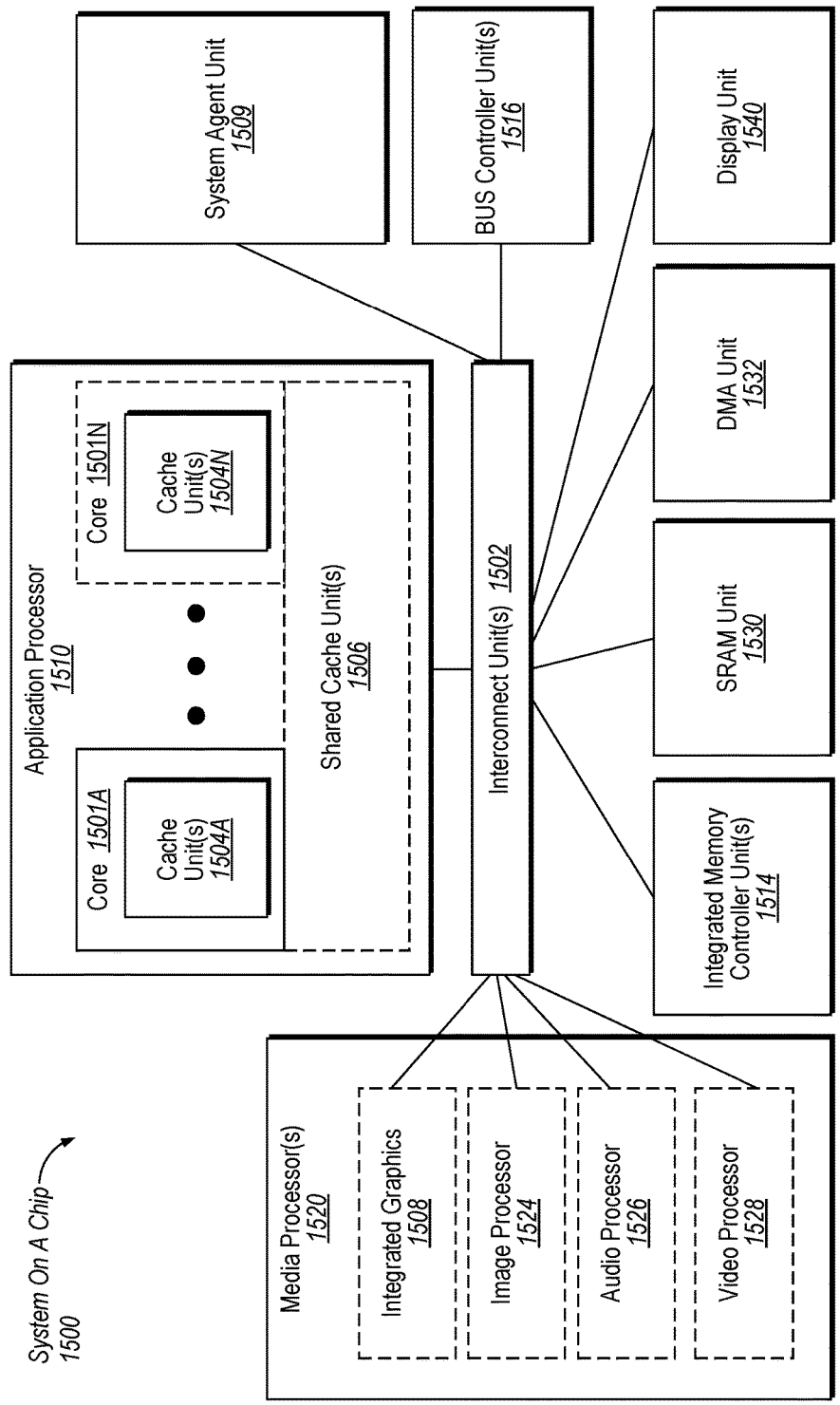
FIG. 15 is a block diagram of computer architecture, according to another embodiment.

FIG. 15 is an exemplary system on a chip (SoC) that may include one or more of the cores 1501. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 15, shown is a block diagram of a SoC 1500 in accordance with an embodiment of the present disclosure. Also, dashed lined boxes are features on more advanced SoCs. In FIG. 15, an interconnect unit(s) 1502 is coupled to: an application processor 1510 which includes a set of one or more cores 1501A-N and shared cache unit(s) 1506; a system agent unit 1509; a bus controller unit(s) 1516; an integrated memory controller unit(s) 1514; a set or one or more media processors 1520 which may include integrated graphics logic 1508, an image processor 1524 for providing still and/or video camera functionality, an audio processor 1526 for providing hardware audio acceleration, and a video processor 1528 for providing video encode/decode acceleration; a static random access memory (SRAM) unit 1530; a direct memory access (DMA) unit 1532; and a display unit 1540 for coupling to one or more external displays. The embodiments of the pages additions and content copying can be implemented in SoC 1500.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
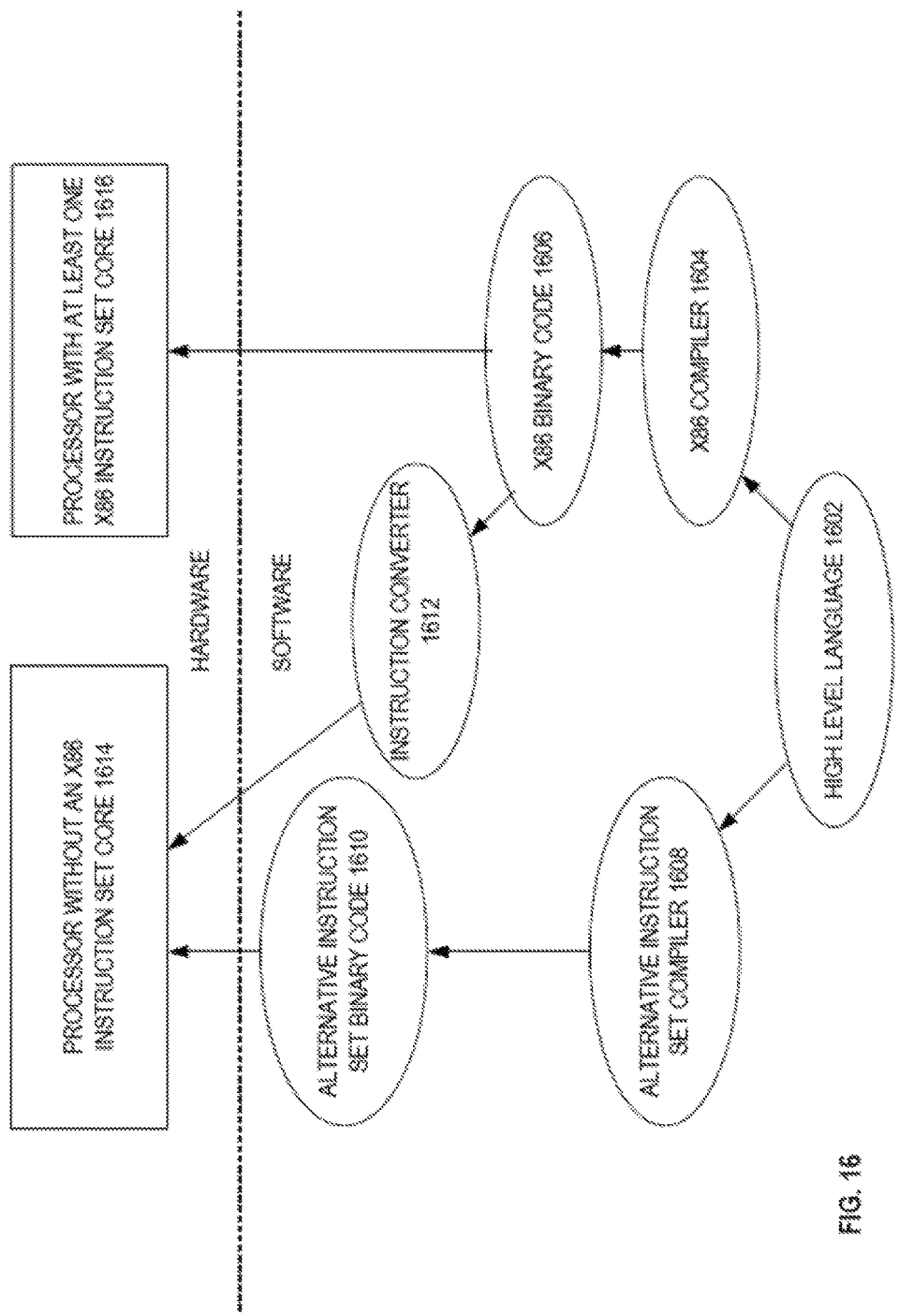
FIG. 16 is a block diagram of use of a software instruction converter to convert binary instructions in a source instruction set to binary instructions in a target instruction set, according to one embodiment.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616.

Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 3-8 may also optionally apply to any of FIGS. 1-2. Moreover, components, features, and details described for any of the apparatus may also optionally apply to any of the methods, which in embodiments may be performed by and/or with such apparatus. Any of the processors described herein may be included in any of the computer systems disclosed herein. In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

The following examples pertain to further embodiments.

Example 1 is a processor comprising a decode unit to decode an elliptic curve cryptography (ECC) point-multiplication with obfuscated input information instruction, the ECC point-multiplication with obfuscated input information instruction to indicate a plurality of source operands that are to store input information for an ECC point-multiplication operation, wherein at least a portion of the input information that is to be stored in the plurality of source operands is to be obfuscated; and an execution unit coupled with the decode unit, the execution unit, in response to the ECC point-multiplication with obfuscated input information instruction, to store an ECC point-multiplication result in a destination storage location that is to be indicated by the ECC point-multiplication with obfuscated input information instruction.

In Example 2, the processor of Example 1, wherein the plurality of source operands are to store at least one of an obfuscated scalar multiplier, an obfuscated base point, or an obfuscated modulus.

In Example 3, the processor of any one of Examples 1-2, wherein the plurality of source operands are to store one of a reduction constant or an obfuscated reduction constant, wherein the reduction constant is defined by a reduction algorithm for ECC point-multiplication and is derivable from a modulus.

In Example 4, the processor of any one of Examples 1-3, wherein the plurality of source operands are to store an obfuscated secret input parameter and a non-obfuscated public input parameter.

In Example 5, the processor of any one of Examples 1-4, wherein the ECC point-multiplication with obfuscated input information instruction comprises at least one field indicating whether a corresponding portion of the input information for the ECC point-multiplication operation is obfuscated.

In Example 6, the processor of any one of Examples 1-5 further comprising a secret that is not readable by software, wherein the input information cannot be derived without the secret, wherein the ECC point-multiplication result is based on the input information.

In Example 7, the processor of any one of Examples 1-6 further comprising a secret key of the processor that is not readable by software, wherein the obfuscated input information is to include encrypted input information that is to be decrypted with the secret key.

In Example 8, the processor of any one of Examples 1-7, wherein the obfuscated input information is to comprise a value indicating a set of secret non-obfuscated input information, wherein the set of secret non-obfuscated input information is to be at least one of: stored on the processor and not readable by software; or generated on the processor and not readable by software.

In Example 9, the processor of any one of Examples 1-8, wherein the value is to be at least one of: an index that is to be used to select the set of secret non-obfuscated input information; a number that is to be used to select the set of secret non-obfuscated input information; or an identifier of the set of secret non-obfuscated input information.

In Example 10, the processor of any one of Examples 1-9, wherein the ECC point-multiplication with obfuscated input information instruction comprises at least one field that is to be used to determine a size of the plurality of source operands as being one of a plurality of different possible sizes.

In Example 11, the processor of any one of Examples 1-10, wherein the ECC point-multiplication with obfuscated input information instruction comprises: a size indication field that is to be used to determine a base size; and a prime indication field that is to indicate whether a known set of primes is to be used or if a prime is being specified in the obfuscated input information instruction.

In Example 12, the processor of any one of Examples 1-11, wherein the execution unit, in response to a second instance of the ECC point-multiplication with obfuscated input information instruction, is to: detect a failure in an attempt to de-obfuscate the obfuscated input information; and signal a fault.

In Example 13, the processor of any one of Examples 1-12, wherein the execution unit, in response to a second instance of the ECC point-multiplication with obfuscated input information instruction, is to: stop performing the second instance of the ECC point-multiplication with obfuscated input information instruction after an interruption; encrypt an intermediate state associated with interrupted performance of the second instance of the ECC point-multiplication with obfuscated input information instruction with a secret key of the processor that is not readable by software; and store the encrypted intermediate state in a storage location.

In Example 14, the processor of any one of Examples 1-13, wherein the execution unit, in response to a second instance of the ECC point-multiplication with obfuscated input information instruction, is to: stop performing the second instance of the ECC point-multiplication with obfuscated input information instruction after an interruption; and discard an intermediate state associated with interrupted performance of the second instance of the ECC point-multiplication with obfuscated input information instruction.

In Example 15, the processor of any one of Examples 1-14, wherein the ECC point-multiplication with obfuscated input information instruction is to indicate a plurality of registers of the processor, and wherein each of the registers is to store a pointer to a location in a memory that is to store a corresponding one of the plurality of source operands.

In Example 16, the processor of any one of Examples 1-15, wherein the ECC point-multiplication with obfuscated input information instruction is a group operation over a plurality of points of a curve, the group operation comprising at least one of an addition of two points of the curve or a doubling of a point of the curve.

Example 17 is a method comprising: receiving, by a processor, an elliptic curve cryptography (ECC) point-multiplication with obfuscated input information instruction indicating a plurality of source operands storing input information for an ECC point-multiplication operation, wherein at least a first portion of the input information stored in the plurality of source operands is obfuscated; and storing an ECC point-multiplication result, in a destination storage location indicated by the ECC point-multiplication with obfuscated input information instruction, in response to the receiving of the ECC point-multiplication with obfuscated input information instruction.

In Example 18, the processor of Example 17, wherein the first portion of the input information is obfuscated with a secret, wherein the secret is available to the processor and the secret is not readable by software.

In Example 19, the processor of any one of Examples 1-18, wherein the first portion of the plurality of source operands stores at least one of an obfuscated exponent, an obfuscated base, and an obfuscated modulus.

In Example 20, the processor of any one of Examples 1-19, wherein the plurality of source operands stores at least one of a reduction constant and an obfuscated reduction constant, wherein the reduction constant is defined by a reduction algorithm for ECC point-multiplication and is derivable from a modulus.

In Example 21, the processor of any one of Examples 1-20, wherein the ECC point-multiplication with obfuscated input information instruction comprises at least one field indicating whether a corresponding portion of the input information for the ECC point-multiplication operation is obfuscated.

Example 22 is a system to process instructions comprising: an interconnect; a processor coupled with the interconnect, the processor to: receive an elliptic curve cryptography (ECC) point-multiplication with obfuscated input information instruction indicating a plurality of source operands that are to store input information for an ECC point-multiplication operation, wherein at least a first portion of the input information that is to be stored in the plurality of source operands is to be obfuscated; and store, in response to receiving the ECC point-multiplication with obfuscated input information instruction, an ECC point-multiplication result in a destination storage location that is to be indicated by the ECC point-multiplication with obfuscated input information instruction; and a dynamic random access memory (DRAM) coupled with the interconnect, the DRAM storing instructions including a plurality of different instances of the ECC point-multiplication with obfuscated input information instruction, wherein each of the different instances of the ECC point-multiplication with obfuscated input information instruction indicate a corresponding set of source operands, wherein each set of source operands stores different types of obfuscated input information for the different instances of the ECC point-multiplication with obfuscated input information instruction.

In Example 23, the processor of Example 22, wherein the processor is to receive an instruction indicating the plurality of source operands which are to store at least one of an obfuscated scalar multiplier, an obfuscated base point, and an obfuscated modulus.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "storing," "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a decode unit to decode an elliptic curve cryptography (ECC) point-multiplication instruction, wherein the ECC point-multiplication instruction indicates a plurality of source operands that are to store input information for an ECC point-multiplication operation, wherein the input information in the plurality of source operands comprises an obfuscated first portion derived from a first value that is to be used in the ECC point-multiplication operation; and
   an execution unit coupled with the decode unit, wherein the execution unit is to execute the ECC point-multiplication instruction to:
   cause a de-obfuscation unit to transform the obfuscated first portion of the input information into the first value using a secret of the processor;
   perform, using the first value derived by transformation of the obfuscated first portion of the input information, the ECC point-multiplication operation to generate an ECC point-multiplication result; and
   store the ECC point-multiplication result in a destination storage location that is to be indicated by the ECC point-multiplication instruction.

2. The processor of claim 1, wherein the input information comprises at least one of an obfuscated scalar multiplier, an obfuscated base point, or an obfuscated modulus.

3. The processor of claim 1, wherein the plurality of source operands comprises a reduction constant or an obfuscated reduction constant, wherein the reduction constant is defined by a reduction algorithm for ECC point-multiplication and is derivable from a modulus.

4. The processor of claim 1, wherein the plurality of source operands comprises an obfuscated secret input parameter and a non-obfuscated public input parameter.

5. The processor of claim 1, wherein the ECC point-multiplication instruction comprises at least one field to indicate whether a corresponding portion of the input information for the ECC point-multiplication operation is obfuscated.

6. The processor of claim 1, wherein the secret is not readable by software, wherein the obfuscated first portion of the input information cannot be transformed into the first value without the secret, wherein the ECC point-multiplication result is based on the input information.

7. The processor of claim 1, wherein the secret is a secret key of the processor that is not readable by software, wherein the decode unit is to decode the instruction that is to indicate the input information, wherein the obfuscated first portion is encrypted data that is to be transformed into the first value by the de-obfuscation unit using the secret key.

8. The processor of claim 1, wherein the input information is to comprise a second portion indicating a set of secret non-obfuscated input information, wherein the set of secret non-obfuscated input information is to be at least one of:
   stored on the processor and not readable by software; or
   generated on the processor and not readable by software.

9. The processor of claim 8, wherein the second portion is to be at least one of:
   an index that is to be used to select the set of secret non-obfuscated input information;
   a number that is to be used to select the set of secret non-obfuscated input information; or
   an identifier of the set of secret non-obfuscated input information.

10. The processor of claim 1, wherein the ECC point-multiplication instruction comprises at least one field that is to be used to determine a size of the plurality of source operands as being one of a plurality of different possible sizes.

11. The processor of claim 10, wherein the ECC point-multiplication instruction comprises:
   a size indication field that is to be used to determine a base size; and
   a prime indication field that is to indicate whether a known set of primes is to be used or if a prime is being specified in the ECC point-multiplication instruction.

12. The processor of claim 1, wherein the execution unit is to execute a second instance of the ECC point-multiplication instruction to:
   detect a failure in an attempt to transform the obfuscated first portion into the first value, the input information comprising operands of the second instance of the ECC point-multiplication instruction; and
   signal a fault based on the failure.

13. The processor of claim 1, wherein the secret is a secret key of the processor, wherein the execution unit is to execute a second instance of the ECC point-multiplication instruction to:
   stop performing the second instance of the ECC point-multiplication instruction after an interruption;
   encrypt an intermediate state associated with interrupted performance of the second instance of the ECC point-multiplication instruction with the secret key of the processor that is not readable by software; and
   store the encrypted intermediate state in a storage location.

14. The processor of claim 1, wherein the execution unit is to execute a second instance of the ECC point-multiplication instruction to:
   stop performing the second instance of the ECC point-multiplication instruction after an interruption; and
   discard an intermediate state associated with interrupted performance of the second instance of the ECC point-multiplication instruction.

15. The processor of claim 1, wherein the ECC point-multiplication instruction is to indicate a plurality of registers of the processor, and each of the plurality of registers is to store a pointer to a location in a memory that is to store a corresponding one of the plurality of source operands.

16. The processor of claim 1, wherein the ECC point-multiplication instruction is a group operation over a plurality of points of a curve, the group operation comprising at least one of an addition of two points of the curve or a doubling of a point of the curve.

17. The processor of claim 1, wherein the input information includes a non-obfuscated second portion that is to be used in the ECC point-multiplication operation, wherein the ECC point multiplication operation is to be performed using the first value and the non-obfuscated second portion to generate the ECC point multiplication result.

18. The processor of claim 1, wherein the execution unit is to execute the ECC point multiplication instruction to:
cause the de-obfuscation unit to transform an obfuscated second portion of the input information into a second value, wherein the ECC point multiplication operation is to be performed using the first value and the second value to generate the ECC point multiplication result.

19. A method comprising:
receiving, by a processor, an elliptic curve cryptography (ECC) point-multiplication instruction at a decode unit of the processor, wherein the ECC point-multiplication instruction indicates a plurality of source operands storing input information for an ECC point-multiplication operation, wherein the input information stored in the plurality of source operands comprises an obfuscated first portion derived from a first value that is to be used in the ECC point-multiplication operation;
executing the ECC point-multiplication instruction at execution unit circuitry of the processor to:
cause a de-obfuscation unit to transform the obfuscated first portion of the input information into the first value using a secret of the processor; and
perform the ECC point-multiplication operation using the first value derived by transforming the obfuscated first portion of the input information to generate an ECC point-multiplication result; and
storing the ECC point-multiplication result, in a destination storage location indicated by the ECC point-multiplication instruction.

20. The method of claim 19, wherein the secret is available to the processor and the secret is not readable by software, wherein the execution unit circuitry causes the de-obfuscation unit to transform the obfuscated first portion of the input information into the first value using the secret.

21. The method of claim 19, wherein the obfuscated first portion of the input information comprises at least one of an obfuscated exponent, an obfuscated base, and an obfuscated modulus.

22. The method of claim 19, wherein the plurality of source operands comprise at least one of a reduction constant and an obfuscated reduction constant, wherein the reduction constant is defined by a reduction algorithm for ECC point-multiplication and is derivable from a modulus.

23. A system to process instructions, the system comprising:
an interconnect;
a processor coupled with the interconnect, the processor to:
access an elliptic curve cryptography (ECC) point-multiplication instruction using the interconnect, wherein the ECC point-multiplication instruction is to indicate a plurality of source operands that are to store input information for an ECC point-multiplication operation, wherein the input information in the plurality of source operands comprises an obfuscated first portion derived from a first value that is to be used in the ECC point-multiplication operation, and wherein the processor comprises:
a decode unit to decode the ECC point-multiplication instruction; and
execution unit circuitry to execute the decoded ECC point-multiplication instruction to:
cause a de-obfuscation unit to transform the obfuscated first portion of the input information into the first value using a secret of the processor;
perform the ECC point-multiplication operation using the first value derived by transforming the obfuscated first portion of the input information to generate an ECC point-multiplication result; and
store the ECC point-multiplication result in a destination storage location that is to be indicated by the ECC point-multiplication instruction; and
a dynamic random access memory (DRAM) coupled with the interconnect, the DRAM storing instructions including a plurality of different instances of the ECC point-multiplication instruction, wherein each of the different instances of the ECC point-multiplication instruction indicate a corresponding set of source operands, wherein each set of source operands comprises different types of obfuscated portions of input information for the different instances of the ECC point-multiplication instruction.

24. The system of claim 23, wherein the ECC point-multiplication instruction comprises at least one of an obfuscated scalar multiplier, an obfuscated base point, or an obfuscated modulus.

* * * * *